US008499147B2

(12) United States Patent
Ikeda et al.

(10) Patent No.: US 8,499,147 B2
(45) Date of Patent: Jul. 30, 2013

(54) ACCOUNT MANAGEMENT SYSTEM, ROOT-ACCOUNT MANAGEMENT APPARATUS, DERIVED-ACCOUNT MANAGEMENT APPARATUS, AND PROGRAM

(75) Inventors: Tatsuro Ikeda, Fuchu (JP); Koji Okada, Tokyo (JP); Tomoaki Morijiri, Chofu (JP); Minoru Nishizawa, Fuchu (JP); Hidehisa Takamizawa, Fuchu (JP); Yoshihiro Fujii, Fuchu (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 825 days.

(21) Appl. No.: 12/501,169

(22) Filed: Jul. 10, 2009

(65) Prior Publication Data
US 2009/0327706 A1   Dec. 31, 2009

Related U.S. Application Data

(63) Continuation of application No. PCT/JP2008/064706, filed on Aug. 18, 2008.

(30) Foreign Application Priority Data

Sep. 11, 2007 (JP) ................................ 2007-235711

(51) Int. Cl.
*H04L 9/00*   (2006.01)
(52) U.S. Cl.
USPC ............... 713/155; 713/156; 713/157; 726/2; 726/5; 726/18; 726/19
(58) Field of Classification Search
USPC ................... 713/155–157; 726/2, 5, 18, 19
See application file for complete search history.

(56) References Cited

U.S. PATENT DOCUMENTS 7,539,861 B2 *   5/2009   Trench ........................... 713/157
7,543,140 B2 *   6/2009   Dillaway et al. ............... 713/156
(Continued)

FOREIGN PATENT DOCUMENTS

JP   2002-329124   11/2002
JP   2004-356842   12/2004

OTHER PUBLICATIONS

Schneier, Bruce. "Applied Cryptography, 2nd Edition" ©1996 Bruce Schneier. Published by John Wiley & Sons Inc. (pp. 574-576).*

(Continued)

*Primary Examiner* — Edward Zee
*Assistant Examiner* — Thomas Gyorfi
(74) *Attorney, Agent, or Firm* — Oblon, Spivak, McClelland, Maier & Neustadt, L.L.P.

(57) ABSTRACT

A root-account management apparatus generates an electronic signature based on a survival condition and a secret key when an authentication result of a user of a client apparatus is proper, and transmits derived-account credence element information including the survival condition, the electronic signature and a public key certificate to a derived-account management apparatus. The derived-account management apparatus creates derived-account information which becomes valid when the survival condition is satisfied so that the derived-account information includes both the derived-account credence element information which becomes invalid when a validity term of the public key certificate expires and a biometric information template of the user which is valid regardless of this validity term. Accordingly, even if an authentication element as a root (public key certificate) becomes invalid, a derived authentication element (biometric information template) can be prevented from becoming invalid.

5 Claims, 10 Drawing Sheets

U.S. PATENT DOCUMENTS

| | | | | |
|---|---|---|---|---|
| 7,797,533 B2 * | 9/2010 | Murakawa | ............ | 713/156 |
| 7,814,314 B2 * | 10/2010 | Gentry et al. | ............ | 713/158 |
| 7,877,600 B2 * | 1/2011 | Qiu et al. | ............ | 713/157 |
| 7,953,979 B2 * | 5/2011 | Borneman et al. | ............ | 713/175 |
| 8,032,744 B2 * | 10/2011 | Doonan et al. | ............ | 713/156 |
| 8,209,531 B2 * | 6/2012 | Gentry et al. | ............ | 713/158 |
| 2005/0076198 A1 * | 4/2005 | Skomra et al. | ............ | 713/156 |
| 2006/0129817 A1 * | 6/2006 | Borneman et al. | ............ | 713/170 |
| 2007/0074036 A1 * | 3/2007 | Ramzan et al. | ............ | 713/176 |

OTHER PUBLICATIONS

R. Housley, et al., "Internet x. 509 Public Key Infrastructure Certificate and Certificate Revocation List (CRL) Profile", The Internet Society, <URL: http://www.ietf.org/rfc/rfc3280.txt>, Apr. 2002, pp. 1-112.

S. Farrell, et al., "An Internet Attribute Certificate Profile for Authorization", The Internet Society, <URL:http:www.ietf.org/rfc/rfc3281.txt>, Apr. 2002, pp. 1-35.

S. Farrell et al., "An Internet Attribute Certificate Profile for Authorization", The Internet Society, Apr. 2002, <URL: http://www.ietf.org/rfc/rfc3281.txt>, pp. 1-35.

R. Housley et al., "Internet X. 509 Public Key Infrastructure Certificate and Certificate Revocation List (CRL) Profile", The Internet Society, Apr. 2002, <URL: http://www.ietf.org/rfc/rfc3280.txt>, pp. 1-112.

\* cited by examiner

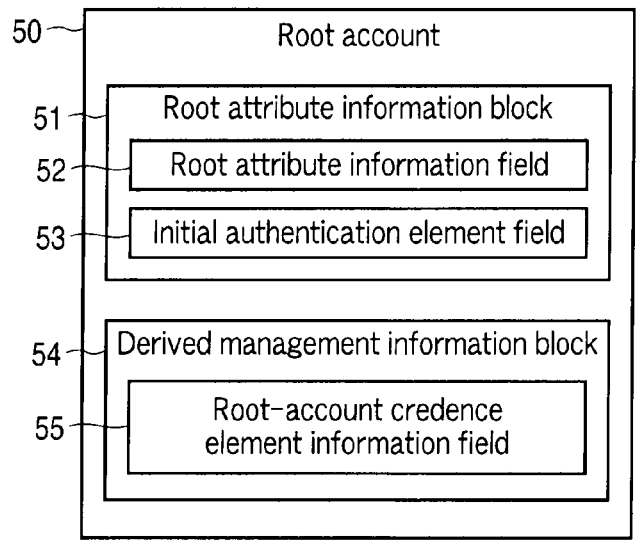

FIG. 3

| Derived-account credence element information | |
|---|---|
| Credence element identification information | Id="000000001" |
| Generation source information | Generator="http://example.co.jp" |
| Generation destination information | AudienceAddress="http://example2.co.jp" |
| Root-account reference information | PAccountRefId="000000002" |
| Survival condition / Derived-account credence element validity term | NotBefore="2007-04-27T00:00:00Z"<br>NotOnAfter="2007-12-31T00:00:00Z" |
| Survival condition / Derived-account extended survival condition | EventEffect="permit"<br>EventSubject="http://example2.co.jp"<br>EventAction="GET APPROVAL"<br>EventObject="http://example3.co.jp"<br>EventCondition<br>    EventType="CREATE ACCOUNT" |
| Security information | Signature algorism, Key information, Signature value |

ACCOUNT MANAGEMENT SYSTEM, ROOT-ACCOUNT MANAGEMENT APPARATUS, DERIVED-ACCOUNT MANAGEMENT APPARATUS, AND PROGRAM

CROSS REFERENCE TO RELATED APPLICATIONS

This is a Continuation Application of PCT Application No. PCT/JP2008/064706, filed Aug. 18, 2008, which was published under PCT Article 21(2) in Japanese.

This application is based upon and claims the benefit of priority from prior Japanese Patent Application No. 2007-235711, filed Sep. 11, 2007, the entire contents of which are incorporated herein by reference.

BACKGROUND OF THE INVENTION

1. Field of the Invention

The present invention relates to an account management system, a root-account management apparatus, a derived-account management apparatus, and a program which manage hierarchical accounts, and for example, relates to an account management system, a root-account management apparatus, a derived-account management apparatus and a program capable of preventing a derived authentication element from becoming invalid even when an authentication element as a root becomes invalid.

2. Description of the Related Art

In recent years, a situation in which physical resources such as specific physical domains and information resources such as files and data are deployed so as to be widely distributed has been found. In such situation, there is known an environment where computers deployed in the physical resources and/or computers holding the information resources are connected through a network (hereinafter, referred to as a wide-area distributed environment).

In this type of wide-area distributed environment, the threat of illegal entry into the physical resources, and leakage or theft of information resources has increased. Against such threat, the importance of a physical security system and an information security system which control access by a user to the physical resource and the information resource has been growing.

In each security system, it is important to properly identify and authenticate a user to verify whether or not the user has a proper security attribute (authority or the like) to an access target.

In the physical security system, entry into a specific limited area is controlled in accordance with the identity of the user. This type of control was realized by utilizing a personal surveillance method by a surveillance agent in the past, and in recent years, it has been realized by utilizing an authentication method using information processing by a computer. As the authentication method using information processing, for example, there is a principal confirmation method of confirming the principal by possession authentication by a secure device such as a smart card and/or biometric authentication based on biometric information, or the like. The control utilizing the authentication method is realized, for example, by confirming the principal by the authentication method and thereafter, further deciding whether or not the user has a proper security attribute to thereby control the entry in accordance with this decision result.

The information security system controls access to a specific file and data in accordance with the identity of the user. This type of control is realized utilizing the authentication method as described above.

Moreover, security systems which provide such authentication of a user as a service have appeared. In such security systems, when an authentication element having a high degree of secrecy such as biometric information is handled, the authentication element is desirably managed independently of general services.

However, in the above-described security systems, an account of a user is often managed independently. In this case, the user presents a physical identity document such as a driver's license, an insurance card, an employee ID card or the like to an administrator of each of the security systems in advance at the time of account registration.

The administrator of the security system decides the validity of the account registration based on the presented identity document. Performing such decision in the security systems places a large burden on the system administrator and the user.

Meanwhile, as an existing technique similar to the account management, PKI (Public Key Infrastructure) and a public key certificate (X. 509 certificate) are known (For example, refer to "Internet X. 509 Public Key Infrastructure Certificate and Certificate Revocation List (CRL) Profile" by R. Housley, W. Polk, W. Ford, and D. Solo <URL: http://www.ietf.org/rfc/rfc3280.txt>). PKI is a framework in which a reliable third-party organization (normally, referred to as Certificate Authority: CA) performs certification in order to certify the identity of the user (individual or organization).

The third-party organization has a public key certificate, referred to as a root certificate (or CA certificate) or the like, for certifying the identity. The third-party organization generates a public key certificate of each user based on this root certificate. The user can certify his or her own identity by such public key certificate. Using such identity certification, the user utilizes a digital signature generated through the use of a secret key (or private key) corresponding to a public key included in the public key certificate, or the like.

Aside from the public key certificate, an attribute certificate for certifying only attribute information or the like and including no public key, has been known (for example, refer to "An Internet Attribute Certificate Profile for Authorization" by S. Farrell, and R. Housley, <URL: http://www.ietf.org/rfc/rfc3281.txt>. The attribute certificate includes attribute information and a serial number of a public key certificate, and is given a digital signature by a secret key corresponding to a public key of this public key certificate. That is, the attribute certificate is generated by being derived from the public key certificate.

In the case where derived authentication elements (as an example, attribute certificates) are generated based on an authentication element as a root (as the example, public key certificate) as described above, if the authentication element of the root becomes invalid, all the derived authentication elements need to be regenerated. However, in the case of the public key certificate and the attribute certificate, a validity term (or survival cycle term) of the public key certificate as the authentication element of the root is longer than that of the attribute certificate as the derived authenticate element, and thus, the impact of the regeneration is small.

BRIEF SUMMARY OF THE INVENTION

However, according to research carried out by the inventor, if the validity term of the derived authentication element is longer than that of the authentication element of the root, the impact of the regeneration is considered to be very large.

For example, when the authentication element is a public key certificate, the validity term of the public key certificate is an intermediate or short term, depending on a key length of a utilized secret key and a cryptographic algorithm imperilment rate. When the authentication element is biometric information, the validity term is long biometric to make forgery of the biometric information difficult.

When the authentication element of the root is a public key certificate and the derived authentication element is biometric information, every time the authentication element of the root (public key certificate) becomes invalid over the medium or short term, the derived authentication element (biometric information) also becomes invalid even if its validity term is long.

That is, there is a problem that when the authentication element as the root and the authentication element derived from the same are independently managed on separate systems, the derived authentication element becomes invalid along with the invalidity of the authentication element as the root.

At this time, in order to continue the service, the system and the like utilizing the derived authentication element, the derived authentication element needs to be regenerated after the regeneration of the authentication element as the root.

Thus, when the validity term of the authentication element as the root becomes invalid, the validity term of the derived authentication element is shortened regardless of unique safety and operational properties of the derived authentication element.

However, when the derived authentication element is biometric information, the biometric information is sensitive, highly detailed information, and requires extreme caution as regards security in its acquirement, which makes frequent updating and regeneration difficult.

Therefore, in view of actual operation, the validity term of the public key certificate, which is the authentication element as the root, is set to a longer term than a validity term to be set in view of cryptographic safety. Thus, it is difficult to appropriately set the validity terms based on the unique safety and operational properties respectively possessed by the authentication element as the root and the derived authentication element.

An object of the present invention is to provide an account management system, a root-account management apparatus, a derived-account management apparatus, and a program capable of preventing a derived authentication element from becoming invalid even if an authentication element as a root becomes invalid.

According to a first aspect of the present invention, there is provided an account management system comprising a root-account management apparatus which manages root-account information for certifying the identity of a user, and a derived-account management apparatus which manages derived-account information generated based on the root-account information, wherein the respective account management apparatuses capable of communicating with a client apparatus of the user, the root-account management apparatus comprising: a root-account storage device which stores the root-account information comprising an initial authentication element field in which initial authentication element information is stored and a derived-account credence element field in which derived-account credence element information is stored; a root-account key storage device in which a secret key of the root-account management apparatus and a public key certificate corresponding to this secret key are stored; a survival condition setting device to set, in advance, a survival condition including a plurality of validity terms for the derived-account credence element information; an initial authentication device configured to authenticate the user of the client apparatus based on the initial authentication element information; a device configured to generate an electronic signature based on the secret key of the root-account management apparatus for credence element identification information, root-account management apparatus identification information, derived-account management apparatus identification information, root-account information reference information, and the survival condition, when an authentication result of the initial authentication device is proper; a device configured to store, in the derived-account credence element information field, the derived-account credence element information consisting essentially of the credence element identification information, the root-account management apparatus identification information, the derived-account management apparatus identification information, the root-account information reference information, the survival condition, the electronic signature and the public key certificate; and a device configured to transmit the derived-account credence element information inside the root-account storage device to the derived-account management apparatus, the derived-account management apparatus comprising: a derived-account storage device configured to store the derived-account information comprising a derived-account credence element field in which the derived-account credence element information is stored and a derived authentication element field in which derived authentication element information is stored; a device configured to verify the electronic signature inside the derived-account credence element information based on the public key certificate inside the relevant derived-account credence element information, upon receiving the derived-account credence element information from the root-account management apparatus; a device configured to verify whether or not the survival condition inside the derived-account credence element information is satisfied when the electronic signature is proper as a result of this verification; a device which creates the derived-account information including the derived-account credence element information in the derived-account credence element field and writes this derived-account information in the derived-account storage device when the survival condition is satisfied as a result of this verification; a device configured to acquire biometric information of the user from the client apparatus, and to create a biometric information template from this biometric information; a device which writes the derived authentication element information including the biometric information template in the derived authentication element field of the derived-account information inside the derived-account storage device; a device configured to verify the electronic signature inside the relevant derived-account credence element information based on the public key certificate inside the derived-account credence element information in the derived-account information inside the derived-account storage device, upon receiving an access request to the derived-account information after the derived authentication element is written; a device configured to verify whether or not the survival condition inside the relevant derived-account credence element information is satisfied when the electronic signature is proper as a result of the verification; and a device configured to deny the access request and to invalidate the derived-account information when the survival condition is not satisfied as a result of this verification.

While in the first aspect, an aggregate of the apparatuses is represented as a "system", the present invention is not limited to this, and the aggregate of the apparatuses or each of the apparatuses may be represented as an "apparatus", "method", "program" or "computer-readable storage medium".

In the first aspect, the configuration is employed in which the derived-account information which becomes valid when the survival condition is satisfied includes both the derived-account credence element information which becomes invalid when the validity term of the public key certificate of the root-account management apparatus expires and the biometric information template of the user which is valid regardless of this validity term. Therefore, the derived authentication element (biometric information template) can be prevented from becoming invalid even if the authentication element as the root (public key certificate) become invalid. Moreover, with the configuration in which the survival condition includes a plurality of validity terms, the validity term of the derived authentication element can be set to temporarily become invalid.

BRIEF DESCRIPTION OF THE SEVERAL VIEWS OF THE DRAWING

FIG. 3 is a schematic diagram showing a configuration of a root account in the same embodiment.

FIG. 4 is a schematic diagram showing a configuration of derived-account credence element information in the same embodiment.

DETAILED DESCRIPTION OF THE INVENTION

Hereinafter, embodiments of the present invention will be described with reference to the drawings.

First Embodiment

Figure 1:
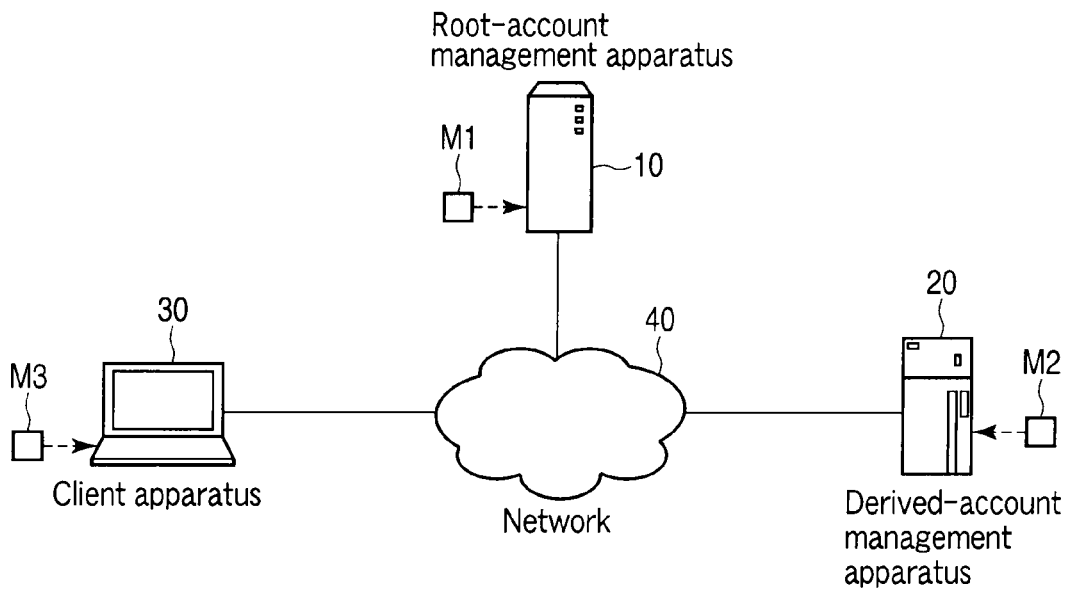
FIG. 1 is a schematic diagram showing a configuration of an account management system according to a first embodiment of the present invention.

FIG. 1 is a schematic diagram showing a configuration example of an account management system according to a first embodiment of the present invention. This account management system includes a root-account management apparatus 10 and a derived-account management apparatus 20 capable of communicating with each other, and a client apparatus 30 which can communicate with each of the account apparatuses 10, 20 through a network 40.

Figure 12:
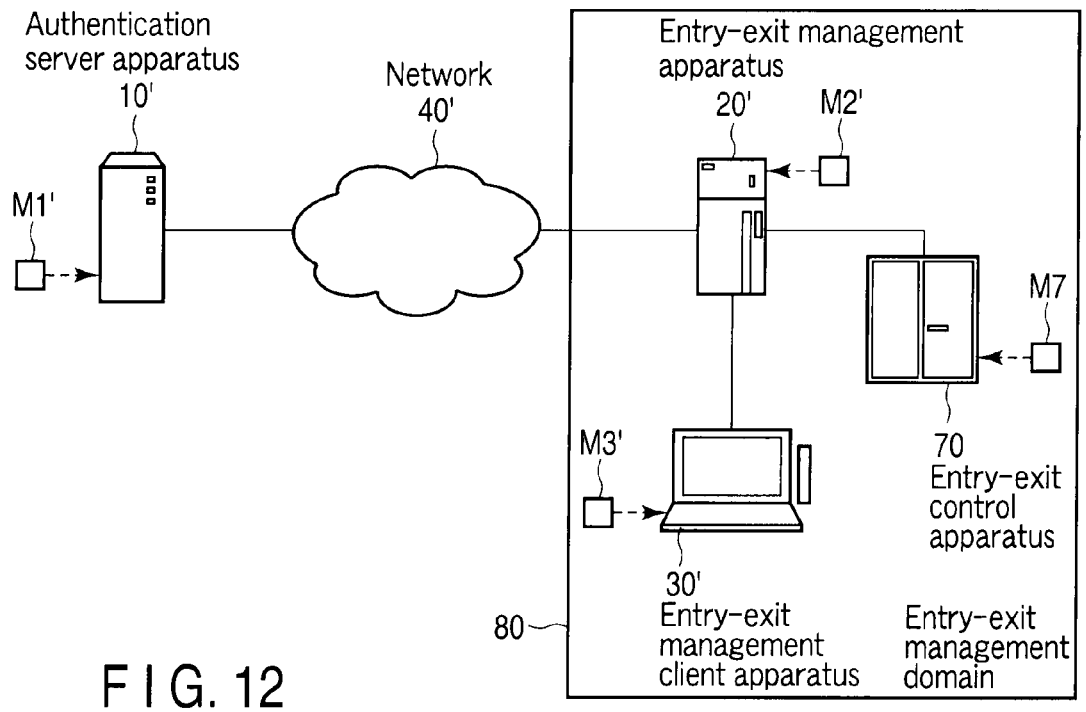
FIG. 12 is a schematic diagram showing a configuration of an entry-exit management system to which an account management system according to a second embodiment of the present invention is applied.

The respective apparatuses 10, 20, 30 can be implemented either in a hardware configuration or in a combined configuration of a hardware resource and software on an apparatus basis. As the software in the combined configuration, a program which is installed in the corresponding apparatus through the network or a recording medium M1, M2, M3, M1', M2', M3' or M7 as shown in FIGS. 1 and 12 to realize a function of the corresponding apparatus is used. This is similar in respective embodiments described below.

Figure 2:
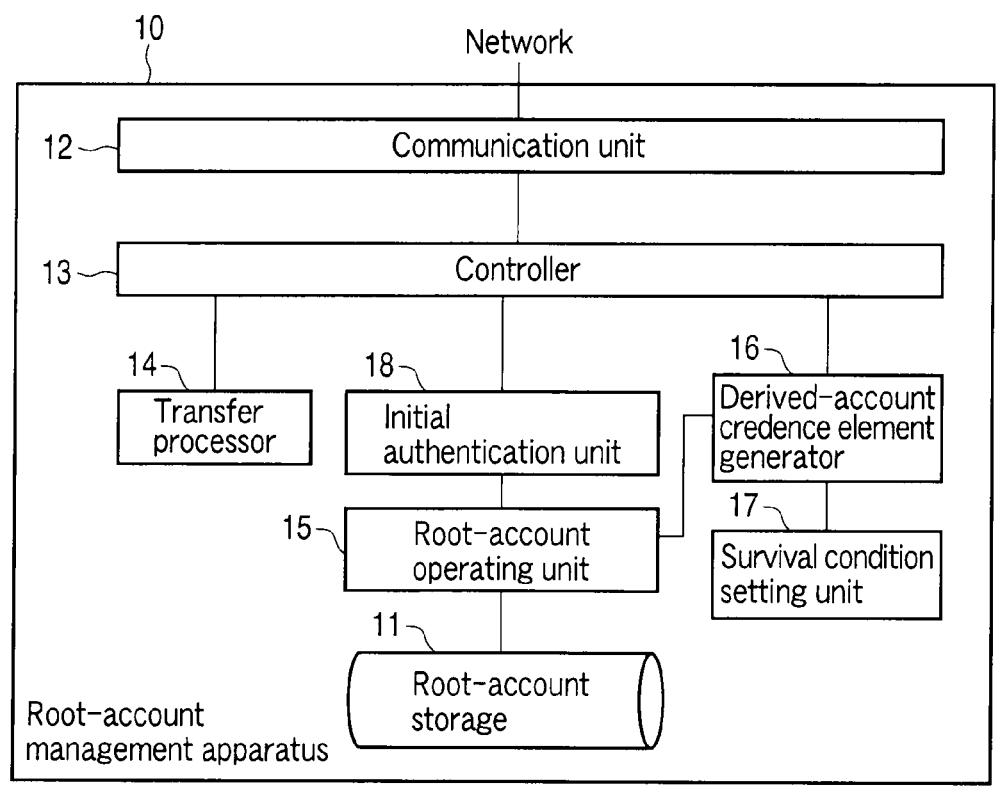
FIG. 2 is a schematic diagram showing a configuration of a root-account management apparatus in the same embodiment.

The root-account management apparatus 10, as shown in FIG. 2, includes a root-account storage 11, a communication unit 12, a controller 13, a transfer processor 14, a root-account operating unit 15, a derived-account credence element generator 16, a survival condition setting unit 17, and an initial authentication unit 18.

The root-account storage 11 is a storage device readable/writable from the respective units 12 to 18, and stores a root account (information) 50 including derived-account credence element information, and a secret key of the root-account management apparatus 10 and a public key certificate (not shown) corresponding to this secret key, as shown in FIG. 3. The root account 50 is an account which is a root of all identity certification of the user, and is created for certifying the identity of the user in the real world. For identity certification processing for creating the root account 50, an arbitrary method can be applied. In the present embodiment, the root account 50 has been stored in the root-account storage 11 in advance.

The root account 50 includes a root attribute information block 51 and a derived management information block 54.

The root attribute information block 51 is an aggregate of attribute information fields 52, 53 associated with a target subject of the root account 50. The root attribute information block 51 includes the root attribute information field 52 and the initial authentication element field 53.

The root attribute information field 52 is a field which stores general attribute information that the target subject of the root account 50 has. The attribute information corresponds to, for example, an account ID of the root account 50, a name, an address and the like. The root account 50 may optionally include the root attribute information field 52.

The initial authentication element field 53 is a field which stores an authentication element of initial authentication that the root-account management apparatus 10 utilizes (hereinafter, referred to as an initial authentication element). The initial authentication element corresponds to, for example, a password and public key certificate pair or the like.

The derived management information block 54 is an aggregate of fields for managing derived-account credence element information 56 generated for a derived account 60. The derived management information block 54 includes a derived-account credence element information field 55.

In the derived-account credence element information field 55, the derived-account credence element information 56 generated for the derived account 60, which will be described later, is stored. However, not only a configuration where the derived-account credence element information 56 is stored in the derived-account credence element information field 55, but also a configuration where only reference information for acquiring the derived-account credence element information 56 is stored may be employed. Moreover, a repository which stores the derived-account credence element information 56 may be constructed outside the root-account management apparatus 10 to refer to the root account 50 from the derived-account credence element information 56. In either case, it is only necessary to hold the association between the derived-account credence element information 56 and the root account 50 and refer to the root account 50 as needed.

The derived-account credence element information 56 is information for confirming the propriety of the derived account 60, as shown in FIG. 4, and includes credence element identification information, generation source information, generation destination information, root-account reference information, survival condition information and security information. The credence element identification information is identification information of the derived-account credence element information 56. The generation source information is identification information of the root-account management apparatus 10. The generation destination information is identification information of the derived-account management apparatus 20. The root-account reference information is identification information for referring to the root account 50.

The generation destination information may be an identifier unique to the root account such as a user ID, or may be temporary random number information (pseudo-random) established with respect to a derived account such as a pseudonym.

The survival condition information is information indicating a survival condition of the entire derived account, and here, an example in which the survival condition information is a portion of the derived-account credence element information 56 is described. Two survival conditions are designated as the survival condition information. One is a survival condition of the derived-account credence element information 56. The other is a survival condition of the derived account.

The survival condition of the derived-account credence element information 56 is a derived-account credence element validity term. For the derived-account credence element validity term, a form of representing it by a validity start date (NotBefore) and a validity end date (NotOnAfter), a form of indicating a validity period or the like can be used. With the form of representing the derived-account credence element validity term by the validity start date and the validity end date, in this example, before the validity start date excluding the start date and after the validity end date including the end date are indicated. However, as to whether or not to include the designated dates, an arbitrary definition may be applied as needed. Moreover, a plurality of validity terms may be indicated, and for example, a plurality of pairs of the validity start dates and the validity end dates may be indicated.

The survival condition of the derived account is a derived-account extended survival condition (hereinafter, also referred to as an extended survival condition), and represents a survival condition that is independent of the derived-account credence element information 56. This derived-account extended survival condition can be defined as a specific event for validating the derived account, a condition for invalidating the derived account, and the like.

The specific event can be defined as, for example, information indicating a case requiring agreement or certification by a third party other than the root-account management apparatus 10, such as judgment of payment ability. In the example of FIG. 4, an event requesting approval from a third party at the time of the derived-account generation is a derived-account extended survival condition. In this example, the derived-account extended survival condition consists essentially of an event subject (EventSubject), an event action (EventAction), an event object (EventObject), an event condition (EventCondition) and an event effect (EventEffect). Since the event subject indicates the derived-account management apparatus 20, it may be implicitly omitted.

The event subject is a subject that performs an event action, and in this example, the event subject is represented in a URL format.

The event action indicates an event action that the event subject should perform, and in this example, indicates an action "GET APPROVAL" of obtaining approval from the event object.

The event object (event object) is an object for which the event action is performed, and in this example, the event object is indicated in the URL format.

The event condition indicates an occurrence condition of the event, and here, further includes an event type (EventType) indicating a type of the event as a child element. An event type "CREATE ACCOUNT" is a type indicating that the event occurs only at the time of account creation. As the event condition, an arbitrary condition other than the event type may be set.

The event effect is an effect when the execution of the event action has succeeded, and an evaluation result of the derived-account extended survival condition. Here, if the derived-account management apparatus (EventSubject) has obtained the approval from a third-party apparatus (EventObject) set in URL http://example3.co.jp (EventAction) at the time of derived-account creation (EventType), an effect (EventEffect) of "permit (permit)" indicating the validity of the derived account is obtained. FIG. 4 shows one example of the survival condition, and a modification to a description in an arbitrary format can be made.

The security information is information for protecting the derived-account credence element information 56 by cryptographic technology. As the cryptographic technology, a general method can be utilized. For example, when a digital signature technology is utilized, a signature algorithm name, key information (public key certificate), a signature value and the like are included in the security information. The signature algorithm name may be omitted in a case where a notification to a verifier is not required, such as a case where a predetermined signature algorithm is used.

The communication unit 12 is a functional unit that enables communication with external entity apparatuses such as the derived-account management apparatus 20, the client apparatus 30 and the like.

The controller 13 is a functional unit to control events and data inside the root-account management apparatus 10, and has a function of controlling the respective units 11, 12, and 14 to 18 so as to perform the operation shown in FIG. 8 and described later.

The transfer processor 14 is a functional unit which processes transfer from a transfer processor of the derived-account management apparatus 20 to interpret requested processing. The requested processing is communicated to an appropriate functional unit inside the root-account management apparatus 10, and a result obtained by performing the processing is returned to the derived-account management apparatus 20 as the transfer source.

Specifically, the transfer processor 14 has a function of receiving a root-account management apparatus name received from the derived-account management apparatus 20, and connection destination information of the derived-account management apparatus 20 to send them out to the initial authentication unit 18, and a function of transferring an authentication result of the initial authentication unit 18 to the derived-account management apparatus 20.

The root-account operating unit 15 is a functional unit which performs an operation on the root account. The operation on the root account involves general CRUD (CREATE, READ, UPDATE, and DELETE) operations on the fields configuring the root account in the present embodiment.

Specifically, the root-account operating unit 15 has a function of transmitting the derived-account credence element information 56 inside the root-account storage 11 to the derived-account management apparatus 20 by the communication unit 12, upon receiving a transmission request of the derived-account credence element information 56 from the communication unit 12.

The derived-account credence element generator 16 is a functional unit which generates the derived-account credence element information 56 for certifying the derived account. If the initial authentication of the user through the initial authentication unit 18 has succeeded, and the request is a request for derived-account credence element information generation from the permitted derived-account management apparatus 20, then the derived-account credence element information 56 is generated. When the survival condition information is caused to be included in the derived-account credence element information 56, the survival condition information is acquired from the survival condition setting unit 17 to cause it to be included as configuration information of the derived-account credence element information 56 to be generated.

Specifically, the derived-account credence element generator 16 has the following functions (f16-1) to (f16-3).

(f16-1) Function of generating an electronic signature based on the secret key of the root-account management apparatus 10, for the credence element identification information, the generation source information, the generation destination information, the root-account reference information, and the survival condition, when the authentication processing by the initial authentication unit 18 has succeeded.

(f16-2) Function of generating the derived-account credence element information 56 consisting of the credence element identification information, generation source information, generation destination information, root-account reference information, survival condition, and the security information (the signature algorithm name, the public key certificate corresponding to the secret key, the electronic signature).

(f16-3) Function of writing this derived-account credence element information 56 in the derived-account credence element information field 55 of the root account 50 inside the root-account storage 11 by the root-account operating unit 15.

The survival condition setting unit 17 is a functional unit which manages the survival condition information for the derived account 60, and has a function of outputting, in response to a request from each of the units, the survival condition setting information, which has been set in advance. The survival condition setting information consists essentially of output condition information of the survival condition information, and the survival condition information.

The output condition information includes a derived account application and derived-account management apparatus identification information. The derived account application is application information of the derived account 60, and for example, there are "PAYMENT" (payment application)", "INTERNAL BUSINESS OPERATIONS (operation application)" and the like. The definition of the information has been shared by the root-account management apparatus 10 and the derived-account management apparatus 20 in advance. The derived-account management apparatus identification information (generation destination information) and the survival condition are as described before.

The initial authentication unit 18 is a functional unit which authenticates the user based on the initial authentication element of the root account 50. As a type of the authentication method performed in the initial authentication unit 18, an arbitrary authentication method can be applied, and as one example, a password authentication method is here used.

Specifically, the initial authentication unit 18 has the following functions (f18-1) to (f18-3).

(f18-1) Function of transmitting input screen data for the user ID and the password to the client apparatus 30 through the controller 13 and the communication unit 12, upon receiving the root-account management apparatus name and the connection destination information of the derived-account management apparatus 20 from the transfer processor 14.

(f18-2) Function of performing the authentication processing of the user by checking a user ID and a password received from the communication unit 12 against a user ID and a password included in the root account inside the root-account storage 11.

(f18-3) Function of sending out the result obtained by performing the authentication processing to the derived-account credence element generator 16.

The derived-account management apparatus 20 manages an account created by being derived from the identity certification of the root account 50 (hereinafter, referred to as a derived account). The derived account holds an authentication element different from the authentication element of the root account 50 (hereinafter, referred to as a derived authentication element), and is managed separately from the root account 50. As a preferred example of the derived-account management apparatus 20, there is a biometric authentication system which holds a biometric information template to provide a biometric authentication service.

Figure 5:
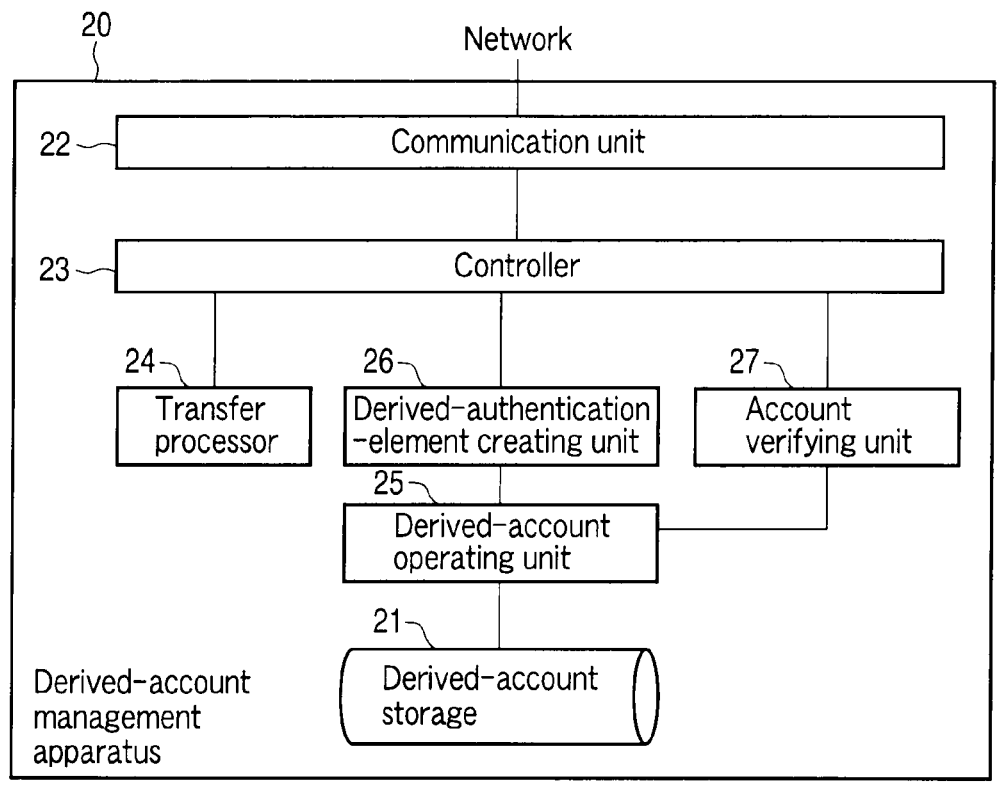
FIG. 5 is a schematic diagram showing a configuration of a derived-account management apparatus in the same embodiment.

The derived-account management apparatus 20 includes a derived-account storage 21, a communication unit 22, a controller 23, a transfer processor 24, a derived-account operating unit 25, a derived-authentication-element creating unit 26, and an account verifying unit 27 as shown in FIG. 5.

Figure 6:
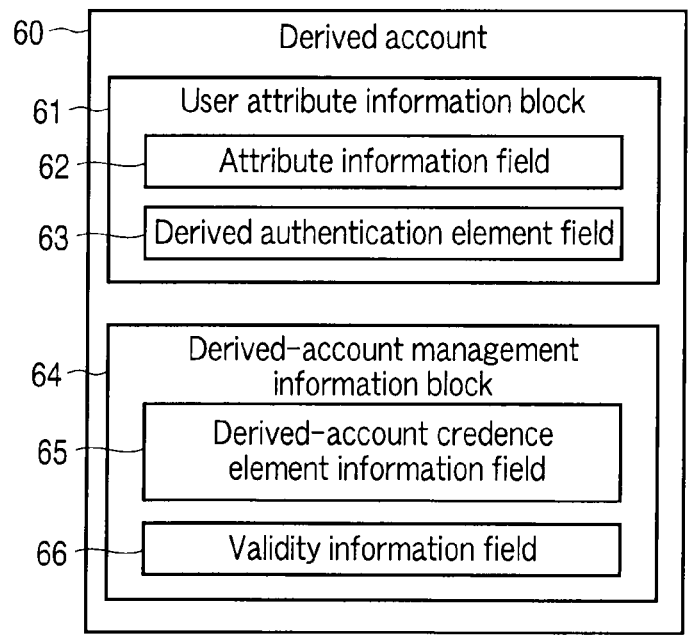
FIG. 6 is a schematic diagram showing a configuration of a derived account in the same embodiment.

The derived-account storage 21 is a storage device readable/writable from the respective units 22 to 27, and stores the derived account (information) 60, the public key certificate of the root-account management apparatus 10, and a secret key of the derived-account management apparatus 20 and a public key certificate corresponding to this secret key, as shown in FIG. 6.

The derived account 60 includes a user attribute information block 61 and a derived-account management information block 64.

The user attribute information block 61 is an aggregate of fields 62, 63 for storing attribute information associated with a target subject of the derived account. The user attribute information block 61 includes the attribute information field 62 and the derived authentication element field 63.

The attribute information field 62 is a field which stores general attribute information that the target subject of the derived account 60 has. For example, it corresponds to an account ID of the derived account 60 or the like. The derived account 60 may optionally include the attribute information field 62.

The derived authentication element field 63 is a field which stores the authentication element that the derived-account management apparatus 20 utilizes, that is, the derived authentication element. The derived authentication element corresponds to, for example, template data of biometric information or the like.

The derived-account management information block 64 is an aggregate of fields 65, 66 for storing information which will be a decision criteria of the survival management of the derived account 60. The derived-account management information block 64 includes the derived-account credence element information field 65 and the validity information field 66.

The derived-account credence element information field 65 is a field which stores the derived-account credence element information 56 generated by the root-account management apparatus 10.

The validity information field 66 is a field which stores information for defining whether or not the derived account 60 is valid (hereinafter, referred to as validity information). The validity information, for example, is represented by "1" when it is valid, and by "0" when it is invalid. The validity information field 66 and the validity information, however, are an arbitrary field and information in the present embodiment.

The communication unit 22 is a functional unit to communicate with external entity apparatuses such as the root-account management apparatus 10, the client apparatus 30 and the like.

Figure 8:
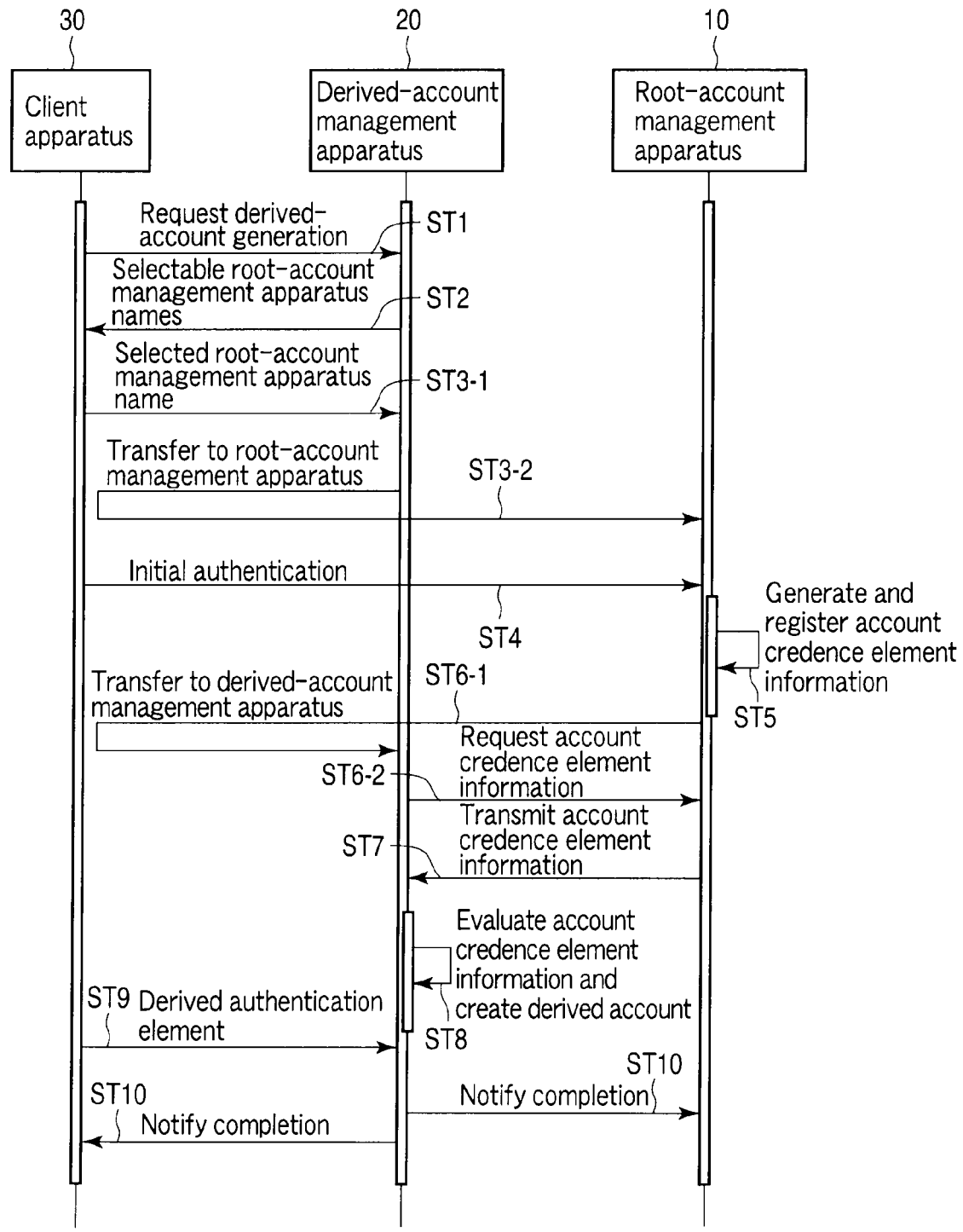
FIG. 8 is a sequence diagram for explaining an operation in the same embodiment.

The controller 23 is a functional unit to control events and data inside the derived-account management apparatus 20, and control the validity of the derived account 60 in accordance with a verification result of the account verifying unit 27, and has a function of controlling the respective units 21, 22, and 24 to 27 so as to perform the operation as shown in FIG. 8.

The transfer processor 24 is a functional unit which processes transfer from the transfer processor 14 of the root-account management apparatus 10 to interpret requested processing. The requested processing is communicated to an appropriate functional unit inside the derived-account management apparatus 20, and a result obtained by performing the processing is returned to the root-account management apparatus 10 as the transfer source.

Specifically, the transfer processor 24 has a function of transferring the root-account management apparatus name received from the client apparatus 30 to the appropriate root-account management apparatus 10, a function of transmitting the connection destination information (URI: Uniform Resource Identifier, URL: Uniform Resource Locator or the like) of the derived-account management apparatus 20 together to the root-account management apparatus 10 in this transfer, and a function of transmitting a transmission request of the derived-account credence element information 56 to the root-account management apparatus 10, upon receiving an authentication result from the root-account management apparatus 10.

The derived-account operating unit 25 is a functional unit which performs an operation on the derived account 60, and has a function of generating the derived account 60 based on the generated derived-account credence element information 56.

The operation to the derived account 60 involves general CRUD (CREATE, READ, UPDATE and DELETE) operations on the fields configuring the derived account 60, and further invalidation processing and validation processing in the present embodiment.

Specifically, the derived-account operating unit 25 has the following functions (f25-1) to (f25-4).

(f25-1) Function of transmitting root-account management apparatus names inside the derived-account storage 21 to the client apparatus 30 through the controller 23 and the communication unit 22, upon receiving a derived-account generation request from the controller 23.

(f25-2) Function of requesting survival verification of the derived account 60 to the account verifying unit 27 when an access request to the derived account 60 is made.

(f25-3) Function of accessing the derived account 60 to perform the user authentication based on the user attribute information block 61 of the derived account 60 if a verification result received from the account verifying unit 27 is "permit".

(f25-4) Function of denying the access to the derived account 60 to invalidate the derived account 60 if the verification result received from the account verifying unit 27 is "deny".

The derived-authentication-element creating unit 26 has the following functions (f26-1) to (f26-3).

(f26-1) Function of establishing agreement of the derived authentication element with the client apparatus 30 of the user, and creating the agreed derived authentication element.

(f26-2) Function of writing the created, derived authenticated element in the derived authentication element field 63 of the derived account 60 inside the derived-account storage 21.

(f26-3) Function of notifying the client apparatus 30 and the root-account management apparatus 10 of a processing result indicating creation completion or failure of the derived account after writing the derived authentication element.

The account verifying unit 27 is a functional unit which verifies the information of the fields of the derived-account management information block 64 that the derived account 60 has, and has a function of verifying the survival condition included in the derived-account credence element information 56.

Specifically, the account verifying unit 27 has the following functions (f27-1) to (f27-3).

(f27-1) Function of verifying the electronic signature inside the relevant derived-account credence element information 56 based on the public key certificate inside the derived-account credence element information 56 upon receiving the derived-account credence element information 56 from the communication unit 22.

(f27-2) Function of verifying whether or not the survival of the derived account 60 is permitted based on the survival condition included in the derived-account credence element information 56 when the electronic signature is proper as a result of this verification.

(f27-3) Function of creating the derived account 60 by the derived-account operating unit 25 to write in the derived-account storage 21 when the verification result is "permit".

Moreover, the account verifying unit 27 has a function of similarly verifying the survival condition after verifying the electronic signature to send out a verification result to the derived-account operating unit 25 when the survival verification of the derived account 60 is requested from the derived-account operating unit 25.

The client apparatus 30 is an entity apparatus for the user to connect to the root-account management apparatus 10 and the derived-account management apparatus 20.

Figure 7:
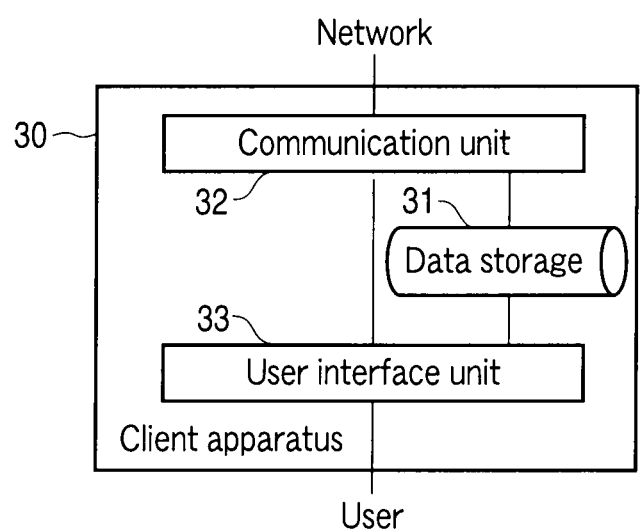
FIG. 7 is a schematic diagram showing a configuration of a client apparatus in the same embodiment.

The client apparatus 30 includes a data storage 31, a communication unit 32, and a user interface unit 33 as shown in FIG. 7.

The data storage 31 is a storage device readable/writable from the communication unit 32 and the user interface unit 33, and for example, is used as a temporary storage device in the processing of the respective units 32, 33.

The communication unit 32 is controlled by the user interface unit 33, serves to communicate with the root-account management apparatus 10 and the derived-account management apparatus 20, and has a reading/writing function with respect to the data storage 31.

The user interface unit 33 has a function of inputting/outputting the data with respect to the client apparatus 30 by an operation of the user, a reading/writing function with respect to the data storage 31, and a function of controlling the communication unit 32.

Specifically, the user interface unit 33 has the following functions (f33-1) to (f33-3).

(f33-1) Function of transmitting a derived-account generation request to the derived-account management apparatus 20 through the communication unit 32 by an operation of the user.

(f33-2) Function of displaying on a screen the root-account management apparatus names that the communication unit 32 has received.

(f33-3) Function of transmitting a root-account management apparatus name selected by an operation of the user during the above-described screen display, from the communication unit 32 to the derived-account management apparatus 20.

Next, the operation of the account management system configured as described above will be described with reference to FIG. 8. This description is given in the order of "Account registration" and "Verification and deletion of derived account".

(Account Registration)

[Step ST1]

In the client apparatus 30, the user interface unit 33 transmits a derived-account generation request to the derived-account management apparatus 20 through the communication unit 32 by an operation of the user.

[Step ST2]

In the derived-account management apparatus 20, when the derived-account operating unit 25 receives this derived-account generating request through the communication unit 22 and the controller 23, the derived-account operating unit 25 transmits root-account management apparatus names indicating the selectable root-account management apparatuses 10 to the client apparatus 30 through the controller 23 and the communication unit 22. The root-account management apparatus names have been written in the derived-account storage 21 in advance.

In the client apparatus 30, when the communication unit 32 receives the root-account management apparatus names, the user interface unit 33 displays these root-account management apparatus names on the screen.

[Step ST3-1]

In the client apparatus 30, the user interface unit 33 selects a root-account management apparatus name by an operation of the user, and transmits this root-account management apparatus name from the communication unit 32 to the derived-account management apparatus 20.

[Step ST3-2]

In the derived-account management apparatus 20, upon receiving this root-account management apparatus name, the transfer processor 24 transfers the received contents to the relevant root-account management apparatus 10 based on the root-account management apparatus name. At this time, the connection destination information of the derived-account management apparatus 20 is also transmitted to the root-account management apparatus 10.

[Step ST4]

In the root-account management apparatus 10, the transfer processor 14 receives the root-account management apparatus name and the connection destination information of the derived-account management apparatus 20 to send them out to the initial authentication unit 18.

Upon receiving this root-account management apparatus name and the connection destination information of the derived-account management apparatus 20, the initial authentication unit 18 authenticates the user through the root-account operating unit 15 based on the initial authentication element inside the root-account storage 11.

For example, if the initial authentication element inside the root-account storage 11 is a password, the initial authentication unit 18 transmits input screen data for a user ID and a password to the client apparatus 30 through the controller 13 and the communication unit 12.

In the client apparatus 30, a user ID and a password input at the user interface unit 33 by an operation of the user is transmitted from the communication unit 32 to the root-account management apparatus 10.

In the root-account management apparatus 10, the initial authentication unit 18 checks the user ID and the password received by the communication unit 12 against the user ID and the password included in the root account inside the root-account storage 11 to thereby perform the authentication processing of the user.

[Step ST5]

When the authentication processing has succeeded by matching of the password received by the communication unit 12 and the password included in the root account of the root-account storage 11, in the root-account management apparatus 10, the derived-account credence element generator 16 generates an electronic signature based on a secret key of the root-account management apparatus for the credence element identification information, the generation source information, the generation destination information, the root-account reference information, and the survival condition. The survival condition has been set in the survival condition setting unit 17 in advance.

Moreover, the derived-account credence element generator 16 generates the derived-account credence element information 56 consisting essentially of the credence element identification information, the generation source information, the generation destination element, the root-account reference information, the survival condition and the security information.

Thereafter, the derived-account credence element generator 16 writes this derived-account credence element information 56 in the derived-account credence element information field 55 of the root account 50 inside the root-account storage 11 by the root-account operating unit 15.

In an arbitrary step after this, the root-account operating unit 15 stores a reference ID of the derived-account credence element information 56 in the root-account storage 11 in association with the relevant derived-account credence element information 56. As the timing of storage, for example, the time point at which the derived account 60 is generated ([Step ST8]) is desirable.

[Step ST6-1]

In the root-account management apparatus 10, the transfer processor 14 transfers an authentication result of the initial authentication unit 18 to the derived-account management apparatus 20.

[Step ST6-2]

In the derived-account management apparatus 20, when the transfer processor 24 receives the authentication result, a transmission request of the derived-account credence element information 56 is transmitted to the root-account management apparatus 10.

[Step ST7]

In the root-account management apparatus 10, when the transmission request of the derived-account credence element information 56 is received by the communication unit 12, the root-account operating unit 15 transmits the derived-account credence element information 56 inside the root-account storage 11 to the derived-account management apparatus 20.

[Step ST8]

In the derived-account management apparatus 20, when the derived-account credence element information 56 is received by the communication unit 22, the account verifying unit 27 verifies an electronic signature in security information, based on the public key certificate inside the security information in this derived-account credence element information 56. As a result of this verification, if the electronic signature is proper, the account verifying unit 27 verifies whether or not the survival of the derived account 60 is permitted based on the survival condition included in the derived-account credence element information 56.

Figure 9:
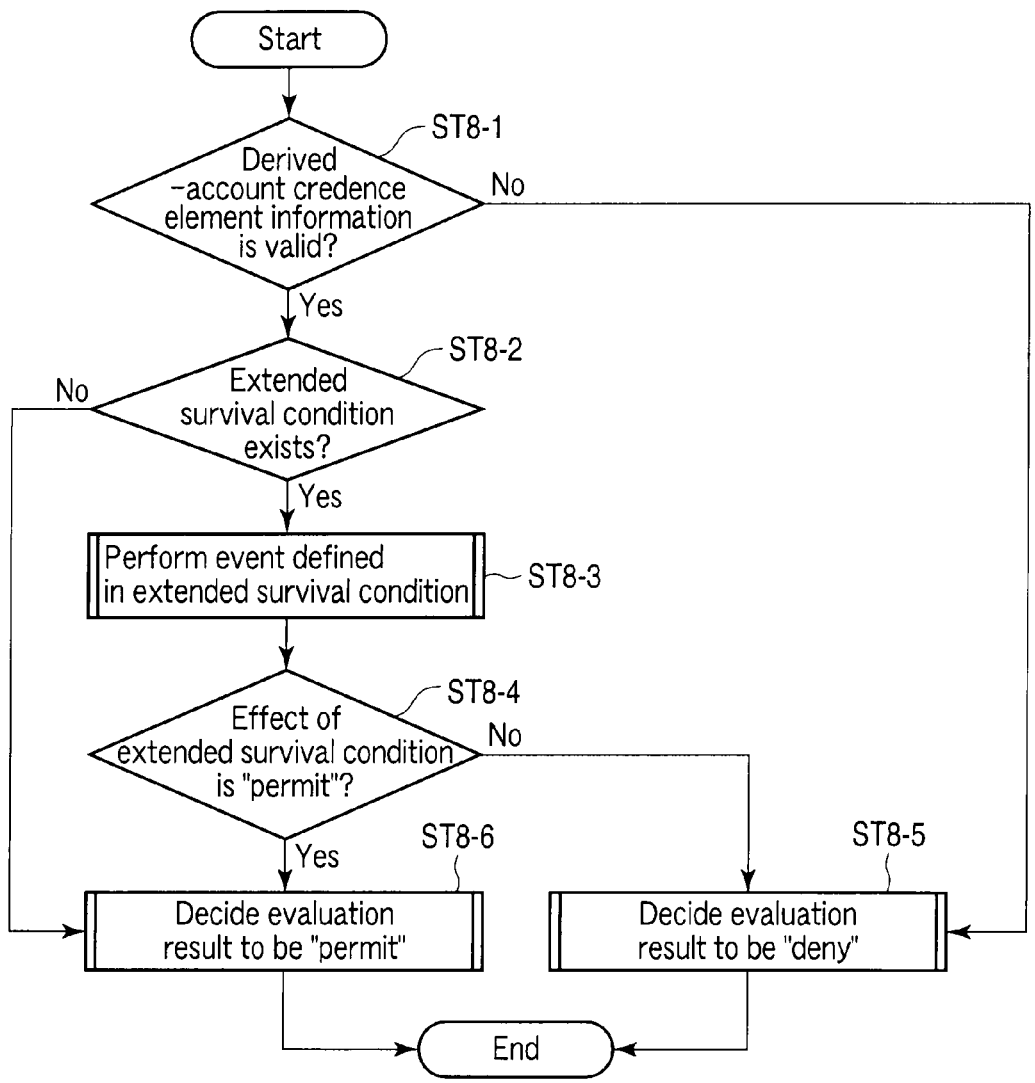
FIG. 9 is a flowchart for explaining an operation in the same embodiment.

Specifically, as shown in FIG. 9, the account verifying unit 27 decides whether or not the derived-account credence element information 56 is valid based on the derived-account credence element validity term inside the derived-account credence element information 56 (ST8-1). If a decision result is negative, the account verifying unit 27 advances to step ST8-5 to end the processing with an evaluation result of "deny".

If the decision result in step ST8-1 indicates "valid", the account verifying unit 27 decides whether or not the derived-account extended survival condition exists in the derived-account credence element information 56 (ST8-2). If the decision result is negative, the account verifying unit 27 advances to step ST8-6 to end the processing with the evaluation result of "permit".

If the decision result in step ST8-2 indicates that the derived-account extended survival condition "exists", the account verifying unit 27 performs the event defined in the derived-account extended survival condition (ST8-3), and then decides whether or not the event effect of the derived-account extended survival condition is "permit" (ST8-4).

If a decision result in step ST8-4 is negative, the account verifying unit 27 advances to step ST8-5 to end the processing with the evaluation result of "deny" (ST8-5).

On the other hand, if the decision result in step ST8-4 is "permit", the account verifying unit 27 advances to step ST8-6 to end the processing with the evaluation result of "permit".

Figure 10:
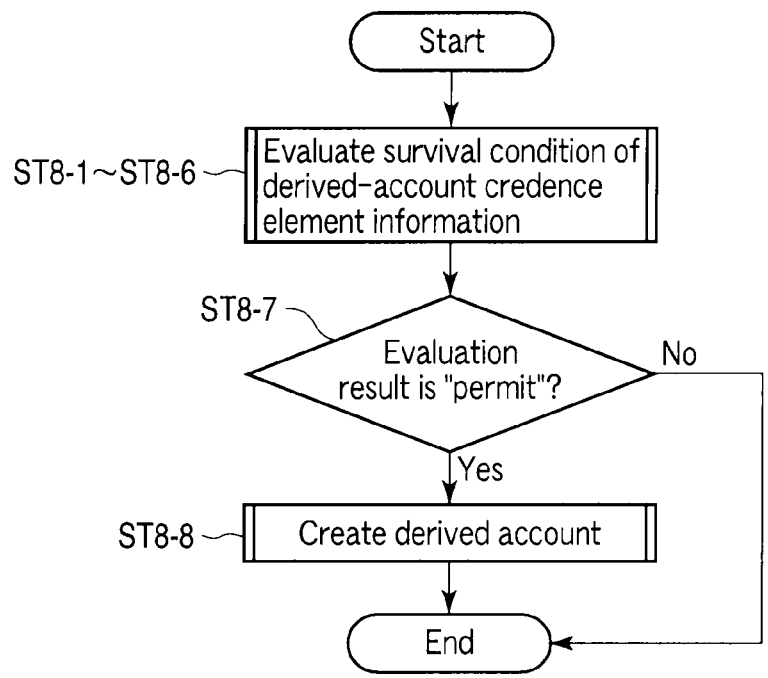
FIG. 10 is a flowchart for explaining an operation in the same embodiment.

Next, upon obtaining the evaluation result of the survival condition of the derived-account credence element information as shown in FIG. 10 (ST8-1 to ST8-6), the account verifying unit 27 decides whether or not the obtained evaluation result is "permit" (ST8-7). The account verifying unit 27 ends the processing if the decision result is negative.

If the decision result in step ST8-7 is "permit", the account verifying unit 27 creates the derived account 60 by the derived-account operating unit 25 (ST8-8), and ends the processing. The derived account 60 is written in the derived-account storage 21 by the derived-account operating unit 25.

[Step ST9]

In the derived-account management apparatus 20, the derived-authentication-element creating unit 26 establishes the agreement of the derived authentication element with the client apparatus 30 of the user, and writes this agreed derived authentication element in the derived authentication element field 63 of the derived account 60 inside the derived-account storage 21. For example, in the case of the biometric authentication, the derived-authentication-element creating unit 26 acquires the biometric information of the user from the client apparatus 30 to create a biometric information template from this biometric information, and gives the template management information to the biometric information template to create the derived authentication element. The template management information may include the various pieces of information of the derived-account credence element information 56. As these respective pieces of information, for example, issue source information (identification information of the root-account management apparatus 10), the root-account reference information and the like can be cited. Alternatively, the template management information may not be given.

Moreover, the derived-authentication-element creating unit 26 may create the derived authentication element by applying an electronic signature to the biometric information template and the template management information in view of guaranteeing the authenticity. When the electronic signature is applied, a signature generation key of the electronic signature is a key possessed by the derived-account management apparatus 20, and generally, is a secret key paired with a public key certificate. For the signature generation key of the electronic signature, a long validity term and a safe key length are selected as compared with the validity term of the public key certificate of the root-account management apparatus 10 and key lengths of other secret keys. Therefore, even when the electronic signature is applied to the biometric information template, the derived authentication element can have a longer validity term than that of the public key certificate of the root-account management apparatus 10. The signature generation key possessed by the derived-account management apparatus 20 and the public key certificate corresponding to this signature generation key have been stored, for example, in the derived-account storage 21 in advance.

In either case, this step ST9 is performed when the derived authentication element is written in the derived authentication element field 63 of the derived account 60.

[Step ST10]

After writing the derived authentication element, in the derived-account management apparatus 20, the derived-authentication-element creating unit 26 notifies the client apparatus 30 and the root-account management apparatus 10 of a processing result indicating completion and failure through the controller 23 and the communication unit 22. Thereafter, the derived account 60 becomes available.

(Verification and Deletion of Derived Account)

Figure 11:
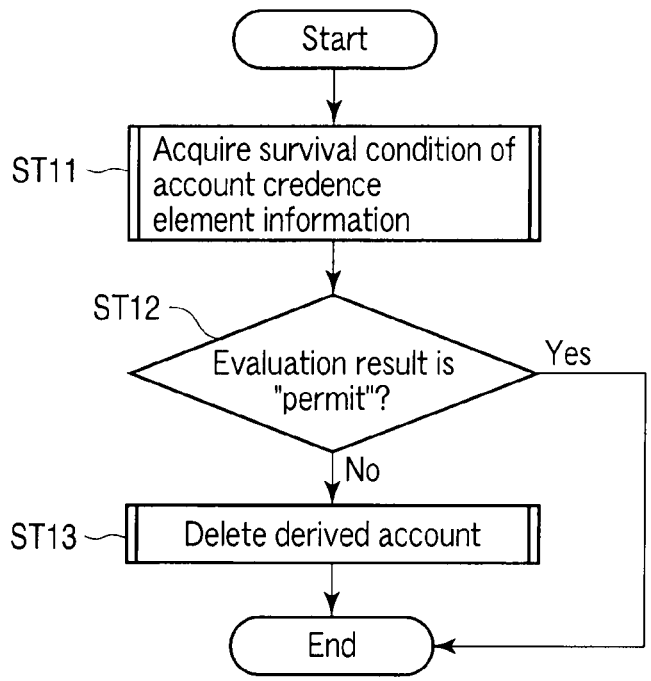
FIG. 11 is a flowchart for explaining an operation in the same embodiment.

Next, operations for verifying and deleting the derived account 60 will be described with reference to FIG. 11. The verification of the derived account 60 is performed at an arbitrary timing. An example in which the verification is performed at the time of access to the user attribute information block of the derived account 60 is described here. It is desirable that the verification of the derived account 60 be performed in utilizing the derived authentication element as in the user authentication by the derived-account management apparatus 20. The following description starts at a time point when the derived-account operating unit 25 accesses the user attribute information block 61 of the derived account 60.

[Step ST11]

In the derived-account management apparatus 20, the derived-account operating unit 25 requests the survival verification of the derived account 60 from the account verifying unit 27 when an access request to the derived account 60 is made. The account verifying unit 27 acquires the derived-account credence element information 56 of the derived account 60 from the derived-account storage 21.

[Step ST12]

The account verifying unit 27 verifies the electronic signature inside the relevant security information based on the public key certificate inside the security information in the acquired derived-account credence element information 56. As a result of this verification, if the electronic signature is proper, the account verifying unit 27 verifies whether or not the survival of the derived account 60 is permitted based on the survival condition inside the derived-account credence element information 56 as shown in FIG. 9 to return the verification result to the derived-account operating unit 25.

The derived-account operating unit 25, in addition to the verification of the survival condition by the account verifying unit 27, may request the survival verification from the root-account management apparatus 10 based on the credence element identification information, the generation source information and the root-account reference information inside the derived-account credence element information 56.

In either case, if the final verification result is "permit", the derived-account operating unit 25 accesses the derived account 60 to perform the user authentication based on the user attribute information block 61 of the derived account 60.

For example, if the biometric information template is stored in the derived authentication element field 63 of the user attribute information block 61, the derived-account operating unit 25 transmits the input message data for the biometric information to the client apparatus 30 through the communication unit 22.

The client apparatus 30 transmits the biometric information input at the user interface unit 33 by an operation of the user, from the communication unit 32 to the derived-account management apparatus 20.

In the derived-account management apparatus 20, the derived-account operating unit 25 checks the biometric information received by the communication unit 22 against the biometric information template included in the derived account inside the derived-account storage 21 to thereby perform the user authentication.

[Step ST13]

On the other hand, if the verification result received from the account verifying unit 27 is "deny", the derived-account operating unit 25 denies the access to the derived account 60, and invalidates the derived account 60.

When the derived account 60 is invalidated, the validity information indicating the invalidity is written over the validity information field 66 of the derived-account management information block 64 for update.

When the denial is performed instead of invalidation, the derived account 60 is deleted. Typically, if there is no explicit designation by the derived-account extended survival condition or the like, it is desirable that the derived account 60 be invalidated instead of being deleted.

This is because, for example, if two sets of validity terms, "Jan. 1, 2007 to Feb. 1, 2007" and "Mar. 1, 2007 to Apr. 1, 2007" are set, invalidation of the derived account 60 only between the two sets of validity terms makes it unnecessary to create the derived account 60 again.

When the invalidation of the derived account 60 is released, the processing from [step ST1] to [step ST6] is performed again to update the derived-account credence element information 56. After the derived-account credence element information 56 is updated, the validity information indicating validity is written over the validity information field 66 of the derived-account management information block 64 of the derived account 60 for update.

As described above, according to the present embodiment, the derived-account information 60, which becomes valid when the survival condition is satisfied, is configured so as to include both of the derived-account credence element information 56, which becomes invalid when the validity term of the public key certification of the root-account management apparatus 10 expires, and the biometric information template of the user, which is valid regardless of this validity term.

This can prevent the derived authentication element (biometric information template) from becoming invalid even if the authentication element as the root (public key certificate) becomes invalid. Moreover, the configuration in which the survival condition includes a plurality of validity terms allows the validity term of the derived authentication element to be set to temporarily and selectively become invalid.

Additionally, with the validity period of the conventional public key certificate, there is a problem in that the validity term of the derived authentication element cannot be temporarily invalidated.

For example, with the conventional validity period, it is impossible to cope with a case where the setting to validate the derived authentication element from Jan. 1, 2007 to Feb. 1, 2007, invalidate the same from Feb. 2, 2007 to the end of February, 2007, and validate the same from Mar. 1, 2007 to Apr. 1, 2007 is desired.

In this case, with the conventional validity period, the derived authentication element is generated with the validity term set to the term from Jan. 1, 2007 to Feb. 1, 2007, is invalidated on Feb. 2, 2007, and then is regenerated with the term set to Mar. 1, 2007 to Apr. 1, 2007. However, regenerating the authentication element after temporarily invalidating the same in this manner imposes a heavy burden on the management subjects of the respective authentication elements and the user.

On the other hand, in the present embodiment, by managing the authentication elements based on the information representing a credence relationship between the authentication elements, the validity condition such as the validity term based on unique safety and operation properties that each of the authentication elements inherently has, and the validity condition such as the validity term that can be certified by the authentication element as the root such as the identification certification can be managed independently of each other, so that the derived authentication element can be controlled autonomously. This can reduce the burden of the regeneration processing of the authentication element and the like, thereby improving user-friendliness.

Moreover, for example, conventionally, when the public key certificate is issued as the authentication element as the root for an individual or an employee, it is highly possible that description contents are relatively frequently updated due to address transfer, reassignment or the like with a validity term, and with this, the need to reissue the public key certificate of the root and to regenerate the derived biometric information arises.

However, according to the present embodiment, as described above, even if the authentication element as the root (public key certificate) becomes invalid, the invalidation of the derived authentication element (biometric information template) can be prevented. Therefore, the burden of the regeneration processing of the authentication element and the like can be reduced, which improves user-friendliness.

Such an effect can be obtained not only in the validity term but also in a survival condition by which an analogous authentication element is decided to be valid. For example, even in the case of the address transfer, reassignment or the like, the term of which is unclear in advance, a configuration in which the survival condition includes a valid address or a valid affiliation, and current address data or affiliate data is input to check against the survival condition can bring about a similar effect.

Moreover, conventionally, since the management subject of each security system manages the account independently, it has been difficult to realize integrated management of the security systems and integrated life cycle management of the accounts. For example, when an employee retires from a company, the account of the employee needs to be quickly deleted at business offices.

However, generally, since retirement of an employee is often notified to business offices verbally and in writing, in some cases, the account of the employee who has already retired may be left in the business offices. Therefore, conventionally, there has been a possibility that a state where the former employee after retirement can access resources without authority exists for a long time. This state causes security concerns.

On the other hand, according to the present embodiment, when an employee retires from a company, at least root account 10 of the root-account management apparatus 10 is invalidated.

Therefore, when upon receiving an access request, the derived-account management apparatus 20 requests the survival verification to the root-account management apparatus 10 based on the credence element identification information, the generation source information and the root-account reference information inside the derived-account credence element information 56, "deny" is notified from the root-account management apparatus 10. In this manner, the access request by the employee who has retired can be denied, so that the derived account 60 can be invalided, and thus, the resources can be protected from the employee who has retired.

Second Embodiment

Figure 13:
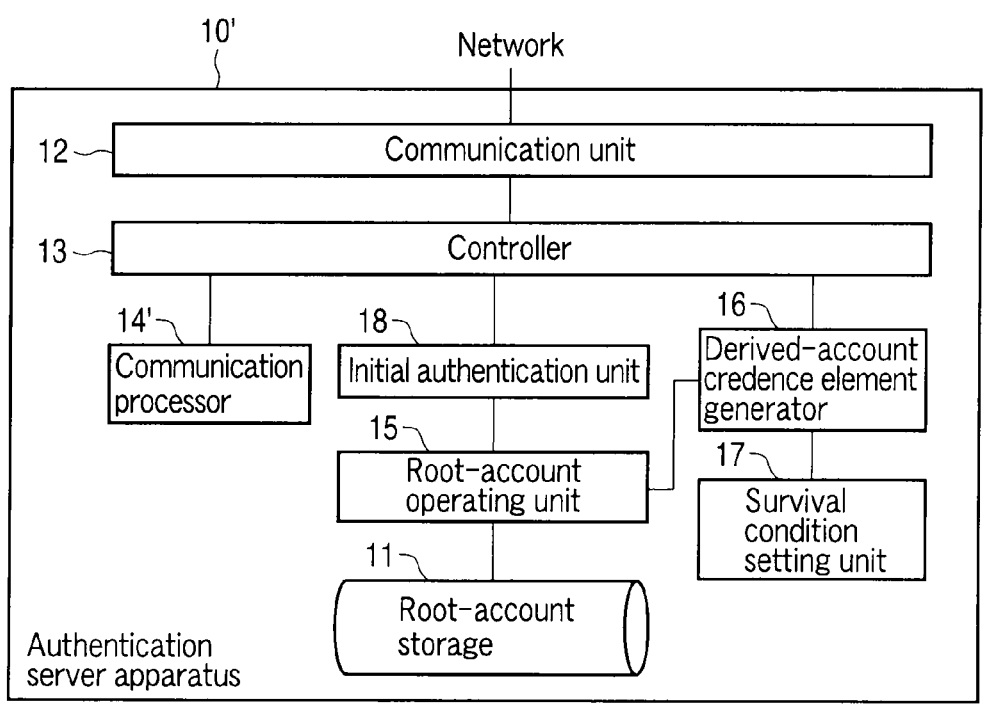
FIG. 13 is a schematic diagram showing a configuration of an authentication server apparatus in the same embodiment.
Figure 14:
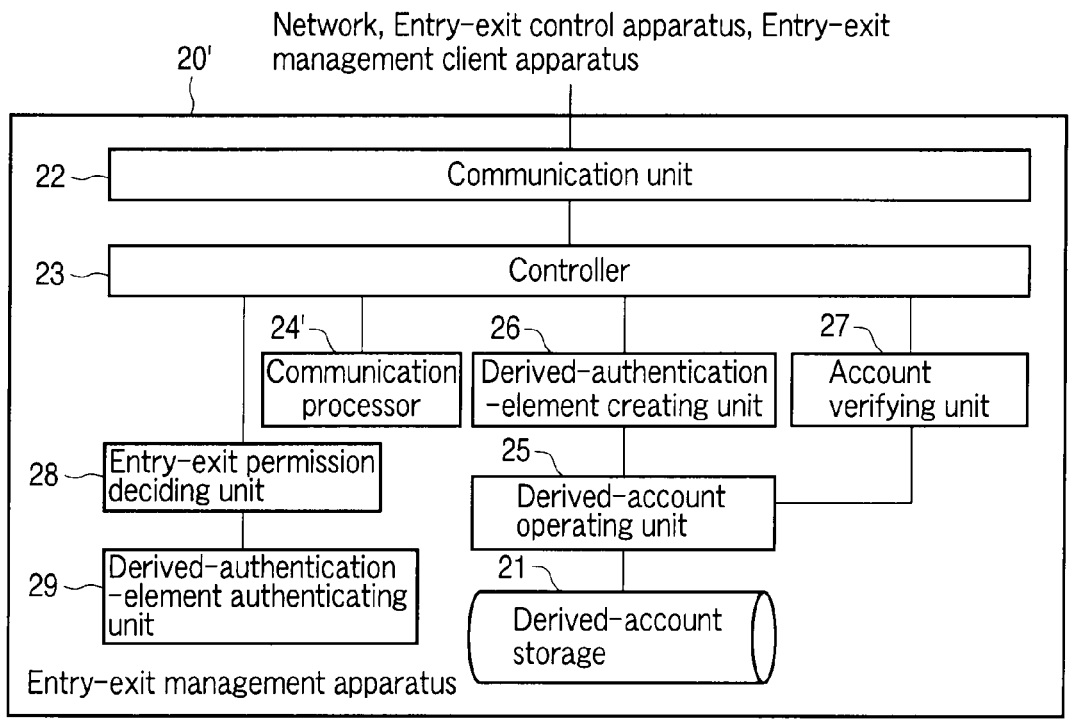
FIG. 14 is a schematic diagram showing a configuration of an entry-exit management apparatus in the same embodiment.
Figure 15:
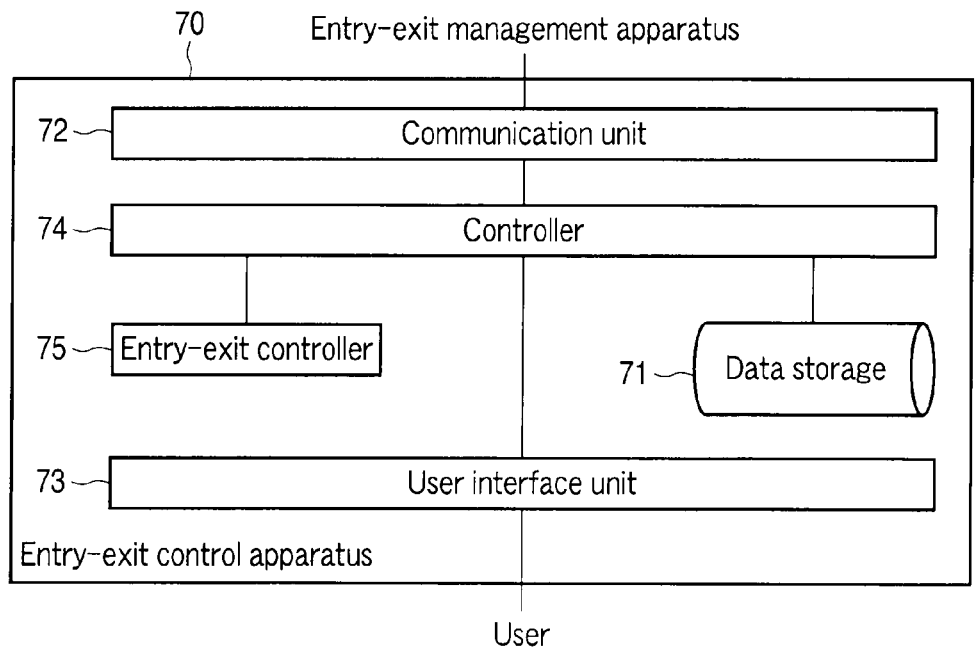
FIG. 15 is a schematic diagram showing a configuration of an entry-exit control apparatus in the same embodiment.

FIG. 12 is a schematic diagram showing a configuration of an entry-exit management system to which an account management system according to a second embodiment of the present invention is applied, and FIGS. 13 to 15 are schematic diagrams showing configurations of respective apparatuses. The same reference numerals are given to the same units as those of the foregoing drawings, detailed descriptions thereof are omitted, and different points are mainly described.

To the entry-exit management system of the present embodiment, an authentication server apparatus 10' and an entry-exit management apparatus 20' are connected through the network 40. To the entry-exit management apparatus 20', an entry-exit management client apparatus 30' and an entry-exit control apparatus 70 are connected through a local network physically or logically isolated from the network 40. The entry-exit management apparatus 20', the entry-exit management client apparatus 30' and the entry-exit control apparatus 70 are deployed in an entry-exit management domain 80 as a physical resource.

The entry-exit management client apparatus 30' may be connected to the network 40 enabling direct communication with the authentication server apparatus 10'. The authentication server apparatus 10' corresponds to the root-account management apparatus 10 of the first embodiment. The entry-exit management apparatus 20' corresponds to the derived-account management apparatus 20 of the first embodiment.

A management target of the authentication server apparatus 10' is a root account as in the root-account management apparatus 10. While in the present embodiment, because of an example of the entry-exit management system, an employee account of a company is used as the root account, but the root account is not limited to this. For example, an account of a financial institute, a residence account in a local municipality or the like can be preferably used.

The authentication server apparatus 10', as shown in FIG. 13, has a similar configuration to that of the root-account management apparatus 10 shown in FIG. 2. However, here, since directly opposite communication between the authentication server apparatus 10' and the entry-exit management apparatus 20' is used, a communication processor 14' is included in place of the transfer processor 14 in FIG. 2.

The communication processor 14' is different from the transfer processor 14 only in a communicational function of directly communicating with the entry-exit management apparatus 20' rather than indirectly transferring via the foregoing client apparatus 30, and the other realized functions are similar to those of the transfer processor 14.

The entry-exit management apparatus 20' has the foregoing derived account 60, and its management target is entry-exit of persons, articles and the like at a border of the entry-exit management domain 80 as a specific domain. As preferred examples of the entry-exit management domain 80, a room, a specific area and the like at a business office, a factory or the like in a company can be cited.

The entry-exit management apparatus 20', as shown in FIG. 14, includes an entry-exit permission deciding unit 28 and a derived-authentication-element authenticating unit 29 in addition to a configuration similar to that of the derived-account management apparatus 20 as shown in FIG. 5. Moreover, a communication processor 24' is included in place of the transfer processor 24 as in the authentication server apparatus 10'.

The entry-exit permission deciding unit 28 has a function of deciding permission or denial of entry-exit based on a result of user authentication by the derived-authentication-element authenticating unit 29, and a function of transmitting a decision result indicating permission or denial by the communication unit 22 to the entry-exit control apparatus 70.

The derived-authentication-element authenticating unit 29 has the following functions (f29-1) and (f29-2).

(f29-1) Function of transmitting input message data for the derived authentication element to the entry-exit control apparatus 70 through the communication unit 22 once the derived-account operating unit 25 is actuated.

(f29-2) Function of checking the derived authentication element (biometric information) received by the communication unit 22 against the derived authentication element (biometric authentication template) included in the derived account inside the derived-account storage 21 to perform the user authentication and send out a result of the user authentication to the entry-exit permission deciding unit 28.

The entry-exit control apparatus 70 is an apparatus which actually controls entry-exit, and when an entry-exit request is made, inquires to the entry-exit management apparatus 20' to acquire permission decision (authentication result) of the entry-exit and control opening and closing of a door or the like. While in the present embodiment, for easy understanding, a configuration is employed in which the entry-exit management apparatus 20' and the entry-exit control apparatus 70 are separated, the configuration is not limited to this, and the entry-exit management apparatus 20' and the entry-exit control apparatus 70 may be realized by one apparatus.

The entry-exit control apparatus 70, as shown in FIG. 15, includes a data storage 71, a communication unit 72, a user interface unit 73, a controller 74, and an entry-exit controller 75.

The data storage 71 is a storage apparatus readable/writable from the respective units 72 to 75, and is used as a temporary storage device in the processing of the respective units 72 to 75, for example.

The communication unit 72 is controlled by the user interface unit 73 and serves to communicate with the entry-exit management apparatus 20', and further, has a reading/writing function with respect to the data storage 71.

The user interface unit 73 has a function of inputting and outputting data with respect to the entry-exit control apparatus 70 by an operation of the user, a reading/writing function with respect to the data storage 71, and a function of controlling the communication unit 72.

Specifically, the user interface unit 73 has the following functions (f73-1) to (f73-3).

(f73-1) Function of transmitting an access request to the entry-exit management apparatus 20' through the communication unit 72 by an operation of the user.

(f73-2) Function of displaying on a screen an input message for the biometric information, which has been received by the communication unit 72.

(F73-3) Function of transmitting, from the communication unit 72 to the entry-exit management apparatus 20', the biometric information input by an operation of the user during this screen display.

The controller 74 is a functional unit to control events and data inside the entry-exit control apparatus 70, and has a function of controlling the respective units 71 to 73 and 75.

The entry-exit controller 75 has a function of controlling operations (unlocking of the door or the like) involving the entry-exit of a control target range (door or the like) of the entry-exit control apparatus 70 in accordance with the authentication result acquired from the entry-exit management apparatus 20' by the communication unit 72.

The entry-exit management client apparatus 30' corresponds to the client apparatus 30, which the user for whom the derived account 60 is created operates in creating the account on the entry-exit management apparatus 20'.

In creating the derived account 60, the creation may be applied in advance on the authentication server apparatus 10'. Only when the prior application or further approval by an approval person having appropriate authority has been made may the derived-account creation request from the entry-exit management apparatus 20' be accepted.

Figure 16:
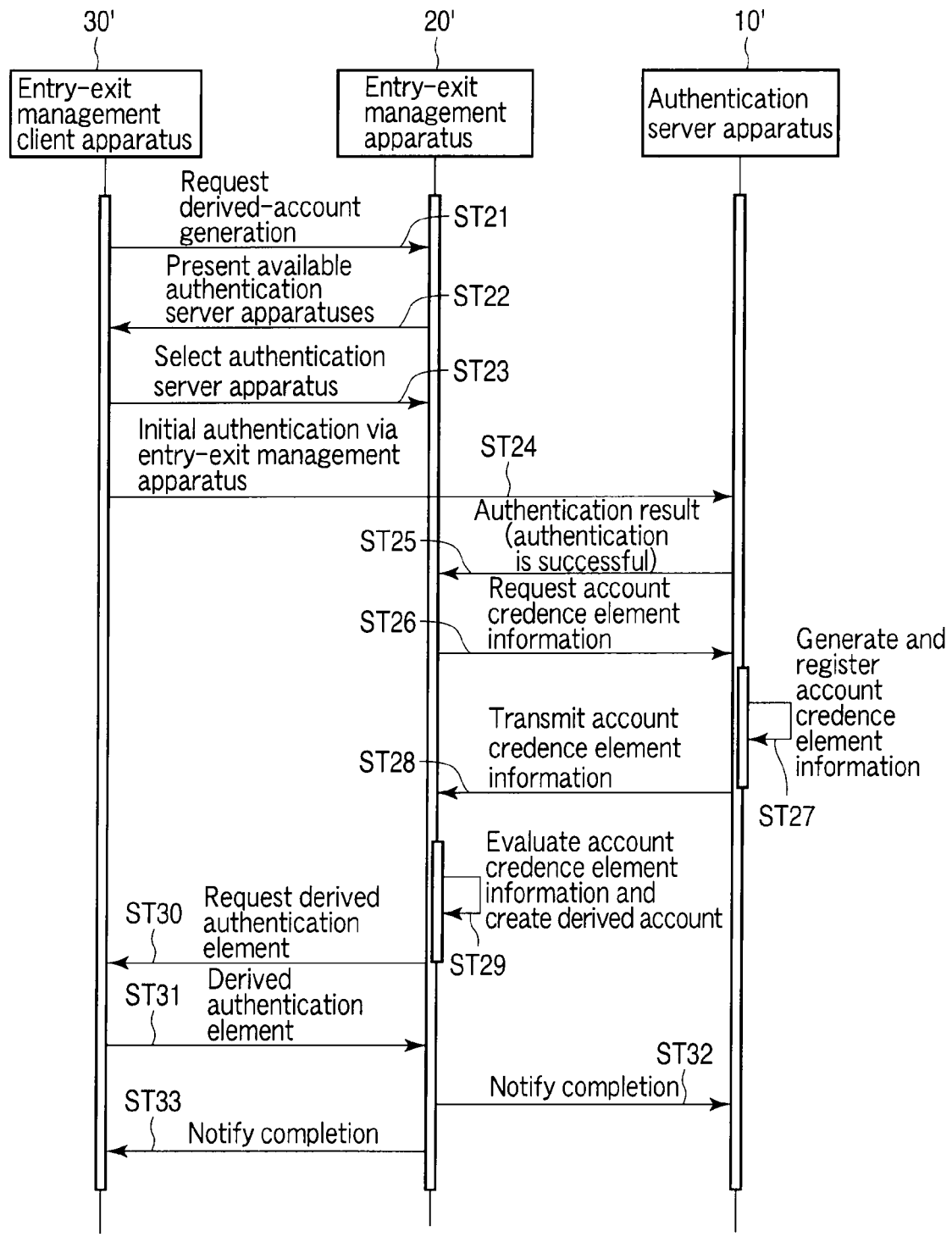
FIG. 16 is a sequence diagram for explaining an operation in the same embodiment.

Next, the operation of the entry-exit management system configured as described above will be described with reference to FIG. 16.

[Step ST21]

In the entry-exit management client apparatus 30', the user interface unit 33 transmits a derived-account generation request to the entry-exit management apparatus 20' through the communication unit 32 by an operation of the user.

[Step ST22]

In the entry-exit management apparatus 20', upon receiving this derived-account generation request through the communication unit 22 and the controller 23, the derived-account operating unit 25 transmits authentication server apparatus names indicating the selectable authentication server apparatuses 10' to the entry-exit management client apparatus 30' through the controller 23 and the communication unit 22. The authentication server apparatus names have been written in the derived-account storage 21 in advance.

In the entry-exit management client apparatus 30', when the communication unit 32 receives the authentication server apparatus names, the user interface unit 33 displays these authentication server apparatus names on a screen.

[Step ST23]

The user selects the authentication server apparatus 10' that certifies his or her own identity.

In the entry-exit management client apparatus 30', the user interface unit 33 selects an authentication server apparatus name by an operation of the user, and transmits this authentication server apparatus name to the entry-exit management apparatus 20' from the communication unit 32.

[Step ST24]

When the communication processor 24' receives the authentication server apparatus name, the entry-exit management apparatus 20' transmits a derived-account creation permission request to the authentication server apparatus 10' based on the authentication server apparatus name.

In the entry-exit management client apparatus 30', the user interface unit 33 generates authentication information by an operation of the user, and the communication unit 32 transmits this authentication information to the authentication server apparatus 10' through the entry-exit management client apparatus 30' and the entry-exit management apparatus 20'.

As a method for generating the authentication information, for example, there can be cited a method of generating the authentication information by utilizing a public key certificate stored in an IC card type employee certificate or the like. As the authentication information described here, for example, encrypted data obtained by encrypting a user ID and a password stored in the employee certificate with a public key inside the public key certificate can be used.

If necessary, an interaction with the authentication server apparatus 10' for generating the authentication information may be performed in this step ST24. For example, upon receiving a random number from the authentication server apparatus 10', the user ID and the password inside the employee certificate are concatenated to this random number, so that encrypted data obtained by encrypting this concatenated data with the public key inside the employee certificate may be used as the authentication information.

[Step ST25]

In the authentication server apparatus 10', the connection is accepted, and the initial authentication unit 18 verifies the authentication information received by the communication processor 14' to thereby perform the authentication processing of the user, and an authentication result is answered to the entry-exit management apparatus 20' from the communication processor 14'.

Here, as a verification method, for example, when the encrypted user ID and password are the authentication information, the authentication information is decrypted based on a secret key corresponding to the public key certificate inside the root-account storage 11, and the obtained user ID and password are checked against a user ID and a password included in the root account in the root-account storage 11, and if both the passwords match, the authentication is successful.

Moreover, in the case where the encrypted data obtained by encrypting the concatenated data of the random number, the user ID and the password is the authentication information, in addition to the foregoing decryption and password matching, a decrypted random number and the random number transmitted in advance are checked against each other, and if both the random numbers match, the authentication is successful.

[Step ST26]

When the authentication result received by the communication processor 24' from the authentication server apparatus 10' indicates authentication success, the entry-exit management apparatus 20' transmits a request for the derived-account credence element information 56 from the communication processor 24' to the authentication server apparatus 10'. This derived-account credence element information 56 has the configuration shown in FIG. 4.

[Step ST27]

In the authentication server apparatus 10', when the request for the derived-account credence element information 56 is received by the communication unit 12, the derived-account credence element generator 16 generates an electronic signature based on a secret key of the authentication server apparatus 10' for the credence element identification information, the generation source information, the generation destination formation, the root-account reference information and the survival condition. The survival condition has been set in advance in the survival condition setting unit 17.

At this time, as one example of the survival condition of the derived account 60, the validity term is set to be "Jan. 1, 2007 to Feb. 1, 2007" and "Mar. 1, 2007 to Apr. 1, 2007". In the above-mentioned example, it is assumed that the entry-exit management is performed in the discrete terms rather than in a continuous term.

Moreover, the derived-account credence element generator 16 generates the derived-account credence element information 56 consisting essentially of the credence element identification information, the generation source information, the generation destination information, the root-account reference information, the survival condition and the security information.

Thereafter, the derived-account credence element generator 16 writes this derived-account credence element information 56 in the derived-account credence element information field 55 of the root account 50 inside the root-account storage 11 by the root-account operating unit 15.

In an arbitrary step after this, the root-account operating unit 15 stores a reference ID of the derived-account credence element information 56 in the root-account storage 11 in association with the relevant derived-account credence element information 56. As the timing of storage, for example, the time point at which the derived account 60 is generated ([Step ST29]) is desirable.

[Step ST28]

In the authentication server apparatus 10', the root-account operating unit 15 transmits the derived-account credence element information 56 inside the root-account storage 11 from the communication unit 12 to the entry-exit management apparatus 20'.

[Step ST29]

In the entry-exit management apparatus 20', when the derived-account credence element information 56 is received by the communication unit 22, the account verifying unit 27 verifies the electronic signature inside the relevant security information based on the public key certificate inside the security information in this derived-account credence element information 56.

If the electronic signature is proper as a result of this verification, the account verifying unit 27 verifies whether or not the survival of the derived account 60 is permitted based on the survival condition included in the derived-account credence element information 56. Specifically, this verification processing is performed as described above with reference to FIGS. 9 and 10.

If the evaluation result is "permit", the derived-account operating unit 25 creates the derived account 60. If the evaluation result is "deny", the derived account 60 is not created.

[Step ST30]

Next, the entry-exit management apparatus 20' transmits the result of the processing and a request for the derived authentication element to the entry-exit management client apparatus 30'.

[Step ST31]

Next, in the entry-exit management apparatus 20', the derived-authentication-element creating unit 26 establishes the agreement of the derived authentication element with the client apparatus 30' of the user, and writes the agreed derived authentication element in the derived authentication element field 63 of the derived account 60 inside the derived-account storage 21.

[Step ST32]

After the derived authentication element is written, in the derived-account management apparatus 20, the derived-authentication-element creating unit 26 notifies the authentication server apparatus 10' of a processing result indicating completion or failure through the controller 23 and the communication unit 22.

[Step ST33]

Next, in the derived-account management apparatus 20, the derived-authentication-element creating unit 26 notifies the entry-exit client apparatus 30' of the processing result indicating completion or failure through the controller 23 and the communication unit 22.

The entry-exit client apparatus 30' displays the received processing result on the screen to notify the user of the processing result. The user is notified of whether all the processing has been completed or the processing has failed by this processing result. When the processing result indicates completion, the derived account 60 becomes available.

(Verification and Deletion of Derived Account)

Operations for verifying and deleting the derived account 60 are similar to the above-described operations except that the configuration is employed in which the entry-exit management apparatus 20' and the entry-exit control apparatus 70 are separated. Hereinafter, a description will be given with reference to the foregoing FIG. 11.

[Step ST11]

The entry-exit control apparatus 70, upon receiving an entry-exit request from a user, transmits an access request to the derived account 60 to the entry-exit management apparatus 20'.

In the entry-exit management apparatus 20', the derived-account operating unit 25 requests the survival verification of the derived account 60 to the account verifying unit 27 when the access request to the derived account 60 is made. The account verifying unit 27 acquires the derived-account credence element information 56 of the derived account 60 from the derived-account storage 21.

[Step ST12]

The account verifying unit 27, as described above, verifies the electronic signature and the survival condition in the acquired derived-account credence element information 56, and returns a verification result to the derived-account operating unit 25.

The derived-account operating unit 25, in addition to the verification of the survival condition by the entry-exit permission deciding unit 28, may request the survival verification from the authentication server apparatus 10' based on the credence element identification information, the generation source information and the root-account reference information inside the derived-account credence element information 56.

In either case, if the final verification result is "permit", the derived-account operating unit 25 accesses the derived account 60 to actuate the derived-authentication-element authenticating unit 29 and perform the user authentication, based on the user attribute information block 61 of the derived account 60.

For example, if the biometric information template is stored in the derived authentication element field 63 of the user attribute information block 61, the derived-authentication-element authenticating unit 29 transmits the input message data for the biometric information to the entry-exit control apparatus 70 through the communication unit 22.

The entry-exit control apparatus 70 transmits the biometric information input at the user interface unit 73 by an operation of the user, from the communication unit 72 to the entry-exit management apparatus 20'.

In the entry-exit management apparatus 20', the derived-authentication-element authenticating unit 29 checks the biometric information received by the communication unit 22 against the biometric information template included in the derived account inside the derived-account storage 21 to thereby perform the user authentication, and sends out the result of the user authentication to the entry-exit permission deciding unit 28.

The entry-exit permission deciding unit 28 decides permission or denial of the entry-exit based on the result of the user authentication. For example, when the result of the user authentication indicates a similarity, the entry-exit permission deciding unit 28 decides permission or denial of the entry-exit in accordance with whether or not this similarity exceeds a predetermined threshold value. As the predetermined threshold value, a value in accordance with the entry-exit control apparatus 70 (value in accordance with a degree of importance of an area which the user wants to enter or leave) may be held.

Thereafter, in the entry-exit management apparatus 20', a decision result indicating permission or denial is transmitted to the entry-exit control apparatus 70 by the communication unit 22.

In the entry-exit control apparatus 70, the entry-exit controller 75 controls unlocking of a door in accordance with the decision result received by the communication unit 72.

[Step ST13]

On the other hand, if the verification result received from the account verifying unit 27 is "deny", the derived-account operating unit 25 denies the access to the derived account 60, and invalidates the derived account 60. A method for performing invalidation and a method for releasing the invalidation are as described above.

According to the present embodiment as described above, even in the configuration where the account management system of the first embodiment is applied to the entry-exit management system, similar actions and effects to those of the first embodiment can be obtained.

The method exhibited in each above-mentioned embodiment can be distributed as a computer executable program by storing into a storage medium such as a magnetic disk (Floppy™ disk, hard disk, etc.), an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

As described above, according to the present invention, even if an authentication element as a root becomes invalid, a derived authentication element can be prevented from becoming invalid. Moreover, a validity term of the derived authentication element can be set to be temporarily invalidated.

What is claimed is:

1. An account management system including a root-account management apparatus, which manages root-account information for certifying the identity of a user, and a derived-account management apparatus which manages derived-account information generated based on the root-account information, wherein the respective account management apparatuses are configured to communicate with a client apparatus of the user, the root-account management apparatus comprising:
a root-account storage device which stores the root-account information including an initial authentication element field in which initial authentication element information is stored and a derived-account credence element field in which derived-account credence element information is stored;
a root-account key storage device in which a first secret key of the root-account management apparatus and a first public key certificate corresponding to the first secret key are stored;

a survival condition setting device configured to set, in advance, a survival condition including a plurality of validity terms for the derived-account credence element information, wherein the plurality of validity terms allows a validity term of the derived-account credence element information to be set so as to temporarily become invalid;

an initial authentication device configured to authenticate the user of the client apparatus based on the initial authentication element information;

a device configured to generate a first electronic signature based on the first secret key of the root-account management apparatus for credence element identification information, root-account management apparatus identification information, derived-account management apparatus identification information, root-account information reference information, and the survival condition, when an authentication result of the initial authentication device is proper;

a device configured to store, in the derived-account credence element information field, the derived-account credence element information including the credence element identification information, the root-account management apparatus identification information, the derived-account management apparatus identification information, the root-account information reference information, the survival condition, the first electronic signature and the first public key certificate; and a device configured to transmit the derived-account credence element information inside the root-account storage device to the derived-account management apparatus, the derived-account management apparatus comprising:

a derived-account storage device configured to store the derived-account information including a derived-account credence element field in which the derived-account credence element information is stored and a derived authentication element field in which derived authentication element information is stored;

a device configured to verify the first electronic signature inside the derived-account credence element information based on the first public key certificate inside the relevant derived-account credence element information, upon receiving the derived-account credence element information from the root-account management apparatus;

a device configured to verify whether or not the survival condition inside the derived-account credence element information is satisfied when the first electronic signature is proper as a result of the verification;

a device which creates the derived-account information including the derived-account credence element information in the derived-account credence element field and writes the derived-account information in the derived-account storage device when the survival condition is satisfied as a result of the verification;

a derived-account key storage device in which a second secret key of the derived-account management apparatus and a second public key certificate corresponding to the second secret key are stored, the second secret key having a long validity term compared with a validity term of the first public key certificate;

a device configured to acquire biometric information of the user from the client apparatus, and to create a biometric information template from the biometric information;

a device configured to generate a second electronic signature based on the second secret key for the biometric information template;

a device which writes the derived authentication element information including the biometric information template and the second electronic signature in the derived authentication element field of the derived-account information inside the derived-account storage device;

a device configured to verify the first electronic signature inside the relevant derived-account credence element information based on the first public key certificate inside the derived-account credence element information in the derived-account information inside the derived-account storage device, upon receiving an access request to the derived-account information after the derived authentication element is written;

a device configured to verify whether or not the survival condition inside the relevant derived-account credence element information is satisfied when the first electronic signature is proper as a result of the verification; and a device configured to deny the access request and to invalidate the derived-account information when the survival condition is not satisfied as a result of the verification, wherein the survival condition includes an extended survival condition so that, in creating the derived-account information, survival is permitted when approval is obtained from a predetermined third-party apparatus other than the root-account management apparatus.

2. A root-account management apparatus which can communicate with a derived-account management apparatus, which manages derived-account information generated based on root-account information for certifying the identity of a user and a client apparatus of the user, and manages the root-account information, the root-account management apparatus comprising:

a root-account storage device which stores the root-account information including an initial authentication element field in which initial authentication element information is stored and a derived-account credence element field in which derived-account credence element information is stored;

a root-account key storage device in which a first secret key of the root-account management apparatus and a first public key certificate corresponding to the first secret key are stored;

a survival condition setting device to set, in advance, a survival condition including a plurality of validity terms for the derived-account credence element information, wherein the plurality of validity terms allows a validity term of the derived-account credence element information to be set so as to temporarily become invalid;

an initial authentication device configured to authenticate the user of the client apparatus based on the initial authentication element information;

a device configured to generate a first electronic signature based on the first secret key of the root-account management apparatus for credence element identification information, root-account management apparatus identification information, derived-account management apparatus identification information, root-account information reference information, and the survival condition, when an authentication result of the initial authentication device is proper;

a device configured to store, in the derived-account credence element information field, the derived-account credence element information including the credence element identification information, the root-account management apparatus identification information, the derived-account management apparatus identification information, the root-account information reference information, the survival condition, the first electronic signature and the first public key certificate; and a device configured to transmit the derived-account credence element information inside the root-account storage device to the derived-account management apparatus, the root-account management apparatus enabling the derived-account management apparatus to create the derived-account information, which becomes valid when the survival condition is satisfied so that the derived-account information includes both the derived-account credence element information, which becomes invalid when a validity term of the public key certificate expires, and a biometric information template of the user which is valid regardless of the validity term, wherein the survival condition includes an extended survival condition so that, in creating the derived-account information, survival is permitted when approval is obtained from a predetermined third-party apparatus other than the root-account management apparatus.

3. A derived-account management apparatus, which can communicate with a root-account management apparatus which manages root-account information for certifying the identity of a user, and a client apparatus of the user, and manages derived-account information generated based on the root-account information, the derived-account management apparatus comprising:

a receiving device configured to receive, from the root-account management apparatus, derived-account credence element information including credence element identification information, root-account management apparatus identification information, derived-account management apparatus identification information, root-account information reference information, a survival condition including a plurality of validity terms, wherein the plurality of validity terms allows a validity term of the derived-account credence element information to be set so as to temporarily become invalid, a first electronic signature, and a first public key certificate corresponding to a first secret key, when the root-account management apparatus transmits the derived-account credence element information by the relevant root-account management apparatus generating the first electronic signature based on the first secret key of the root-account management apparatus for the credence element identification information, the root-account management apparatus identification information, the derived-account management apparatus identification information, the root-account information reference information, and the survival condition when a result of authentication of the user based on initial authentication element information inside the root-account information in the root-account management apparatus is proper;

a derived-account storage device configured to store the derived-account information including a derived-account credence element field in which the derived-account credence element information is stored and a derived authentication element field in which derived authentication element information is stored;

a device configured to verify the first electronic signature inside the derived-account credence element information based on the first public key certificate inside the derived-account credence element information, upon receiving the derived-account credence element information from the root-account management apparatus;

a device configured to verify whether or not the survival condition inside the derived-account credence element information is satisfied when the first electronic signature is proper as a result of the verification;

a device which creates the derived-account information including the derived-account credence element information in the derived-account credence element field, and writes the derived-account information in the derived-account storage device when the survival condition is satisfied as a result of the verification;

a derived-account key storage device in which a second secret key of the derived-account management apparatus and a second public key certificate corresponding to the second secret key are stored, the second secret key having a long validity term compared with a validity term of the first public key certificate;

a device configured to acquire biometric information of the user from the client apparatus, and to create a biometric information template from this biometric information;

a device configured to generate a second electronic signature based on the second secret key for the biometric information template;

a device which writes the derived authentication element information including the biometric information template and the second electronic signature in the derived authentication element field of the derived-account information inside the derived-account storage device;

a device configured to verify the first electronic signature inside the relevant derived-account credence element information based on the first public key certificate inside the derived-account credence element information in the derived-account information inside the derived-account storage device, upon receiving an access request to the derived-account information after the derived authentication element is written;

a device configured to verify whether or not the survival condition inside the relevant derived-account credence element information is satisfied when the first electronic signature is proper as a result of the verification; and a device configured to deny the access request and to invalidate the derived-account information when the survival condition is not satisfied as a result of the verification, wherein the survival condition includes an extended survival condition so that, in creating the derived-account information, survival is permitted when approval is obtained from a predetermined third-party apparatus other than the root-account management apparatus.

4. A non-transitory computer-readable storage medium storing a program for use in a root-account management apparatus, which can communicate with a derived-account management apparatus which manages derived-account information generated based on root-account information for certifying the identity of a user and a client apparatus of the user, and manages the root-account information, the program comprising:

a program code which causes the root-account management apparatus to sequentially perform processing of writing, in a root-account storage device of the root-account management apparatus, the root-account information including an initial authentication element field in which initial authentication element information is stored and a derived-account credence element field in which derived-account credence element information is stored;

a program code which causes the root-account management apparatus to sequentially perform processing of writing, in a root-account key storage device of the computer, a first secret key of the root-account management apparatus and a first public key certificate corresponding to the first secret key;

a program code which causes the root-account management apparatus to sequentially perform survival condition setting processing for setting a survival condition including a plurality of validity terms for the derived-account credence element information in advance, wherein the plurality of validity terms allows a validity term of the derived-account credence element information to be set so as to temporarily become invalid;

a program code which causes the root-account management apparatus to sequentially perform initial authentication processing of authenticating the user of the client apparatus based on the initial authentication element information;

a program code which causes the root-account management apparatus to sequentially perform processing of generating a first electronic signature based on the first secret key of the root-account management apparatus for credence element identification information, root-account management apparatus identification information, derived-account management apparatus identification information, root-account information reference information, and the survival condition, when an authentication result of the initial authentication device is proper;

a program code which causes the root-account management apparatus to sequentially perform processing of storing, in the derived-account credence element information field, the derived-account credence element information including the credence element identification information, the root-account management apparatus identification information, the derived-account management apparatus identification information, the root-account information reference information, the survival condition, the first electronic signature and the first public key certificate; and a program code which causes the root-account management apparatus to sequentially perform processing of transmitting the derived-account credence element information inside the root-account storage device to the derived-account management apparatus, wherein the program enables the derived-account management apparatus to create the derived-account information which becomes valid when the survival condition is satisfied so that the derived-account information includes both the derived-account credence element information which becomes invalid when a validity term of the public key certificate expires, and a biometric information template of the user which is valid regardless of the validity term, wherein the survival condition includes an extended survival condition so that, in creating the derived-account information, survival is permitted when approval is obtained from a predetermined third-party apparatus other than the root-account management apparatus.

5. A non-transitory computer-readable storage medium storing a program for use in a derived-account management apparatus, which can communicate with a root-account management apparatus which manages root-account information for certifying the identity of a user and a client apparatus of the user, and manages derived-account information generated based on the root-account information, the program comprising:

a program code which causes the derived-account management apparatus to sequentially perform receiving processing of receiving, from the root-account management apparatus, derived-account credence element information including credence element identification information, root-account management apparatus identification information, derived-account management apparatus identification information, root-account information reference information, a survival condition including a plurality of validity terms, wherein the plurality of validity terms allows a validity term of the derived-account credence element information to be set so as to temporarily become invalid, a first electronic signature, and a first public key certificate corresponding to a first secret key, when the root-account management apparatus transmits the derived-account credence element information by the relevant root-account management apparatus generating the first electronic signature based on the first secret key of the root-account management apparatus for the credence element identification information, the root-account management apparatus identification information, the derived-account management apparatus identification information, the root-account information reference information, and the survival condition when a result of authentication of the user based on initial authentication element information inside the root-account information in the root-account management apparatus is proper;

a program code which causes the derived-account management apparatus to sequentially perform processing of verifying the first electronic signature inside the derived-account credence element information based on the first public key certificate inside the derived-account credence element information, upon receiving the derived-account credence element information from the root-account management apparatus;

a program code which causes the derived-account management apparatus to sequentially perform verifying whether or not the survival condition inside the derived-account credence element information is satisfied when the first electronic signature is proper as a result of the verification;

a program code which causes the derived-account management apparatus to sequentially perform processing of creating the derived-account information including the derived-account credence element information in the derived-account credence element field and writing the derived-account information in a derived-account storage device when the survival condition is satisfied as a result of the verification;

a program code which causes the derived-account management apparatus to store a second secret key of the derived-account management apparatus and a second public key certificate corresponding to the second secret key, the second secret key having a long validity term compared with a validity term of the first public key certificate;

a program code which causes the derived-account management apparatus to sequentially perform processing of acquiring biometric information of the user from the client apparatus, and creating a biometric information template from this biometric information;

a program code which causes the derived-account management apparatus to generate a second electronic signature based on the second secret key for the biometric information template;

a program code which causes the derived-account management apparatus to sequentially perform processing of writing derived authentication element information including the biometric information template and the second electronic signature in a derived authentication element field of the derived-account information inside the derived-account storage device;

a program code which causes the derived-account management apparatus to sequentially perform processing of verifying the first electronic signature inside the relevant derived-account credence element information based on the first public key certificate inside the derived-account credence element information in the derived-account information inside the derived-account storage device, upon receiving an access request to the derived-account information after the derived authentication element is written;

a program code which causes the derived-account management apparatus to sequentially perform processing of verifying whether or not the survival condition inside the relevant derived-account credence element information is satisfied when the first electronic signature is proper as a result of the verification; and a program code which causes the derived-account management apparatus to sequentially perform processing of denying the access request and invalidating the derived-account information when the survival condition is not satisfied as a result of the verification, wherein the survival condition includes an extended survival condition so that, in creating the derived-account information, survival is permitted when approval is obtained from a predetermined third-party apparatus other than the root-account management apparatus.

* * * * *